(12) United States Patent
Brunel

(10) Patent No.: US 10,705,800 B2
(45) Date of Patent: Jul. 7, 2020

(54) SYSTEMS AND METHODS FOR EVALUATING COMPLIANCE OF IMPLEMENTATION CODE WITH A SOFTWARE ARCHITECTURE SPECIFICATION

(71) Applicant: The MathWorks, Inc., Natick, MA (US)

(72) Inventor: Jean Yves Brunel, Paris (FR)

(73) Assignee: The MathWorks, Inc., Natick, MA (US)

( * ) Notice: Subject to any disclaimer, the term of this patent is extended or adjusted under 35 U.S.C. 154(b) by 110 days.

(21) Appl. No.: 15/861,021

(22) Filed: Jan. 3, 2018

(65) Prior Publication Data
US 2019/0163446 A1 May 30, 2019

(30) Foreign Application Priority Data
Nov. 30, 2017 (EP) ..................................... 17290155

(51) Int. Cl.
*G06F 8/10* (2018.01)
*G06F 11/36* (2006.01)
(Continued)

(52) U.S. Cl.
CPC .................. *G06F 8/10* (2013.01); *G06F 8/35* (2013.01); *G06F 8/42* (2013.01); *G06F 8/43* (2013.01); *G06F 8/74* (2013.01); *G06F 11/28* (2013.01); *G06F 11/3604* (2013.01); *G06F 11/3616* (2013.01)

(58) Field of Classification Search
CPC .......... G06F 8/10; G06F 8/35; G06F 11/3604; G06F 11/3608; G06F 11/36–3696
See application file for complete search history.

(56) References Cited

U.S. PATENT DOCUMENTS 5,962,153 A * 10/1999 Kirino .................. G11B 5/1878
428/812
6,625,759 B1 * 9/2003 Petsinger .............. G06F 11/261
714/21
(Continued)

FOREIGN PATENT DOCUMENTS

CN 104090798 A 10/2014

OTHER PUBLICATIONS

Alex Groce, Klaus Havelund, Gerard Holzmann, Rajeev Joshi, and Ru-Gang Xu. 2014. Establishing flight software reliability: testing, model checking, constraint-solving, monitoring and learning. Annals of Mathematics and Artificial Intelligence 70, 4 (Apr. 2014), 315-349. (Year: 2014).*
(Continued)

*Primary Examiner* — Andrew M. Lyons
(74) *Attorney, Agent, or Firm* — Wolf, Greenfield & Sacks, P.C.

(57) ABSTRACT

A code-proving system is adapted to analyze implementation code for compliance with a at least a specified model. The implementation code can be code that is used to provide control or semi-automated control of a complex electromechanical system, such as an automobile. The specified model may be written to comply with a meta-model such as the software architecture specification known as Automotive Open System Architecture (AUTOSAR).

14 Claims, 13 Drawing Sheets

(51) Int. Cl.
*G06F 8/35* (2018.01)
*G06F 11/28* (2006.01)
*G06F 8/74* (2018.01)
*G06F 8/41* (2018.01)

(56) References Cited

U.S. PATENT DOCUMENTS

| | | | |
|---|---|---|---|
| 7,574,690 B2 | 8/2009 | Shah et al. | |
| 8,020,153 B2* | 9/2011 | Aoshima | G06F 11/3688 717/126 |
| 8,448,130 B1 | 5/2013 | Pillarisetti et al. | |
| 8,464,204 B1* | 6/2013 | Thornton | G06F 11/3608 717/100 |
| 8,745,594 B1* | 6/2014 | Iossiphidis | G06F 11/3688 717/124 |
| 8,856,726 B2* | 10/2014 | Conrad | G06F 8/35 717/104 |
| 8,990,783 B1 | 3/2015 | Yu et al. | |
| 9,460,251 B1* | 10/2016 | Haridass | G06F 17/5036 |
| 9,588,877 B1* | 3/2017 | Adir | G06F 11/3608 |
| 10,275,227 B1* | 4/2019 | Vompolu | G06F 11/3684 |
| 10,296,443 B2* | 5/2019 | Grechanik | G06F 11/366 |
| 10,387,585 B2 | 8/2019 | Manoj Gangadhar | |
| 2001/0034594 A1* | 10/2001 | Kohno | G06F 17/5022 703/14 |
| 2004/0015897 A1* | 1/2004 | Thompson | G06F 9/44589 717/140 |
| 2005/0050515 A1 | 3/2005 | Shah et al. | |
| 2006/0041860 A1 | 2/2006 | Carmichael et al. | |
| 2007/0220342 A1* | 9/2007 | Vieira | G06F 11/3688 714/33 |
| 2007/0266366 A1* | 11/2007 | Bucuvalas | G06F 8/433 717/104 |
| 2008/0086705 A1* | 4/2008 | Balasubramanian | G06F 8/30 716/103 |
| 2008/0109475 A1* | 5/2008 | Burmester | G06F 40/151 |
| 2011/0088011 A1* | 4/2011 | Ouali | G06F 8/10 717/105 |
| 2012/0101800 A1* | 4/2012 | Miao | G06F 11/3612 703/22 |
| 2014/0013313 A1* | 1/2014 | Eker | G06F 11/3604 717/132 |
| 2014/0068697 A1 | 3/2014 | Brucker et al. | |
| 2014/0122028 A1* | 5/2014 | Aberg | G06F 17/50 703/1 |
| 2015/0135166 A1* | 5/2015 | Tarlow | G06F 11/3604 717/125 |
| 2015/0309920 A1* | 10/2015 | Ishigooka | G06F 11/3688 717/126 |
| 2016/0078539 A1* | 3/2016 | Ignatovich | G06Q 40/04 705/37 |
| 2016/0085883 A1* | 3/2016 | Shiraishi | G06F 17/504 703/1 |
| 2016/0224456 A1 | 8/2016 | Weich | |
| 2016/0371060 A1* | 12/2016 | Goja | G06F 8/51 |
| 2016/0371167 A1* | 12/2016 | Manolios | G06F 8/10 |
| 2017/0039039 A1* | 2/2017 | Johnson | G06F 8/35 |
| 2017/0075787 A1* | 3/2017 | Muske | G06F 11/3608 |
| 2017/0131975 A1* | 5/2017 | Balasubramanian | G06F 8/38 |
| 2017/0139678 A1* | 5/2017 | Funakoshi | G06F 8/10 |
| 2017/0154137 A1* | 6/2017 | Shakeri | G06F 17/509 |
| 2017/0262356 A1* | 9/2017 | Ramanathan | G06F 11/3604 |
| 2017/0351493 A1* | 12/2017 | Kintali | G06F 30/34 |
| 2018/0046571 A1* | 2/2018 | Magill | G06F 11/3692 |
| 2018/0196739 A1* | 7/2018 | Li | G06F 8/35 |
| 2018/0314619 A1* | 11/2018 | Jagadeesan | G06F 11/3608 |
| 2018/0349103 A1* | 12/2018 | Brown | G06F 8/35 |
| 2019/0012257 A1* | 1/2019 | Indurthivenkata | G06F 11/3696 |
| 2019/0179727 A1 | 6/2019 | Bouissou et al. | |

OTHER PUBLICATIONS

D. Durisic, M. Staron and M. Tichy, "ARCA—Automated Analysis of AUTOSAR Meta-model Changes," 2015 IEEE/ACM 7th International Workshop on Modeling in Software Engineering, Florence, 2015, pp. 30-35. (Year: 2015).*

M. Goli, J. Stoppe and R. Drechsler, "Automatic equivalence checking for SystemC-TLM 2.0 models against their formal specifications," Design, Automation & Test in Europe Conference & Exhibition (DATE), 2017, Lausanne, 2017, pp. 630-633. (Year: 2017).*

M. Goli, J. Stoppe and R. Drechsler, "Automatic Protocol Compliance Checking of SystemC TLM-2.0 Simulation Behavior Using Timed Automata," 2017 IEEE International Conference on Computer Design (ICCD), Boston, MA, 2017, pp. 377-384. (Year: 2017).*

U.S. Appl. No. 15/972,662, filed May 7, 2018, Bouissou et al.

Extended European Search Report for European Application No. 17290155.5, dated Jun. 6, 2018.

* cited by examiner

AUTOSAR Behavior Specification

In Function required by Autosar Software-Component Rte_IWrite_step_out_e4 :

→IN parameter aData is a *constant pointer to a constant Matrix* application type tst003.typ.app.Array_2_n320to320 that is a 1D-Matrix[2] of base-element type *Integer* application type tst003.typ.app.Int_n320to320

▼Legit design-value must be in constrained-range[-320···320] (subject of prove)

It represents an application-number in range [-320···320] expressed in AUTOSAR unit: tst003.typ.units.NoUnit.

Its computation method is defined by tst003.typ.compumethods.Identical

Its data-constraint is defined by tst003.typ.app.constraints.n320to320

The underlying implementation type is *Integer* implementation type tst003.typ.impl.SInt32

It is mapped to software base-type *Integer* type sint32 sint32. Defined as an AUTOSAR Platform-Type (integral) signed integer of 32 bits: [(-2147483647 - 1)···2147483647]

Defined as an AUTOSAR Platform-Type (integral)

AUTOSAR Behavior Specification | Search

SYSTEMS AND METHODS FOR EVALUATING COMPLIANCE OF IMPLEMENTATION CODE WITH A SOFTWARE ARCHITECTURE SPECIFICATION

RELATED APPLICATIONS

This application claims priority under 35 U.S.C. 119(a) to European patent application No. 17290155.5, titled "Systems and Methods for Evaluating Compliance of Implementation Code with a Software Architecture Specification," filed with the European Patent Office on Nov. 30, 2017, the entire contents of which are incorporated herein by reference.

SUMMARY

The described technology relates to evaluating compliance of implementation code with a specified model that has been developed under the constraints of a software architecture specification, referred to herein as a meta-model or meta-model description. The implementation code may be part of a larger system-control code base that is intended to provide automated or semi-automated control of, for example, a complex and dynamic system, such as an automobile. The implementation code that is to be evaluated may have been written to comply with a specified model developed for the dynamic system, according to some embodiments. For example, the implementation code can be prepared from a specified model developed by a system engineer. The specified model can specify the behavior of different segments of the implementation code, among other things. In other embodiments, the implementation code can be legacy code, and the legacy code can be checked for compliance with a later-developed specified model. The implementation code can be computer or machine code that, when executed, causes control of at least one feature of the system. In embodiments, the specified model and the meta-model constrain the way in which the implementation code can interact with and control the dynamic system.

Some embodiments relate to a method comprising acts related to evaluating compliance of implementation code with at least a specified model. A method may comprise acts of receiving a specified model written to comply, at least in part, with constraints of a meta-model and receiving implementation code corresponding to the specified model that comprises code that, when executed, performs at least one function for controlling one or more physical components of a dynamic system. The method can further include acts of identifying, from the specified model, a model part relevant to a functionality performable by the implementation code; translating the model part into at least one provable data construct; extracting, from the implementation code, a first code extract containing a code part that corresponds to the model part; automatically analyzing the first code extract to determine one or more attributes associated with the code part; determining compliance of the one or more attributes with the at least one provable data construct; and providing results of the automated analysis and compliance determination for display that identify whether the code part complies with at least the corresponding model part described in the specified model.

Some embodiments relate to a computing system comprising at least one processor adapted with computer program instructions to execute the method of evaluating compliance of implementation code with at least a specified model as described above and in further detail below.

Some embodiments relate to computer-readable medium encoding computer program instructions that, when executed by at least one processor, perform a method of evaluating compliance of implementation code with at least a specified model as described above and in further detail below.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 8A through FIG. 8C depict embodiments of panels for a graphical user interface that may be used to display results of code analyses and receive user input;

Figure 1:
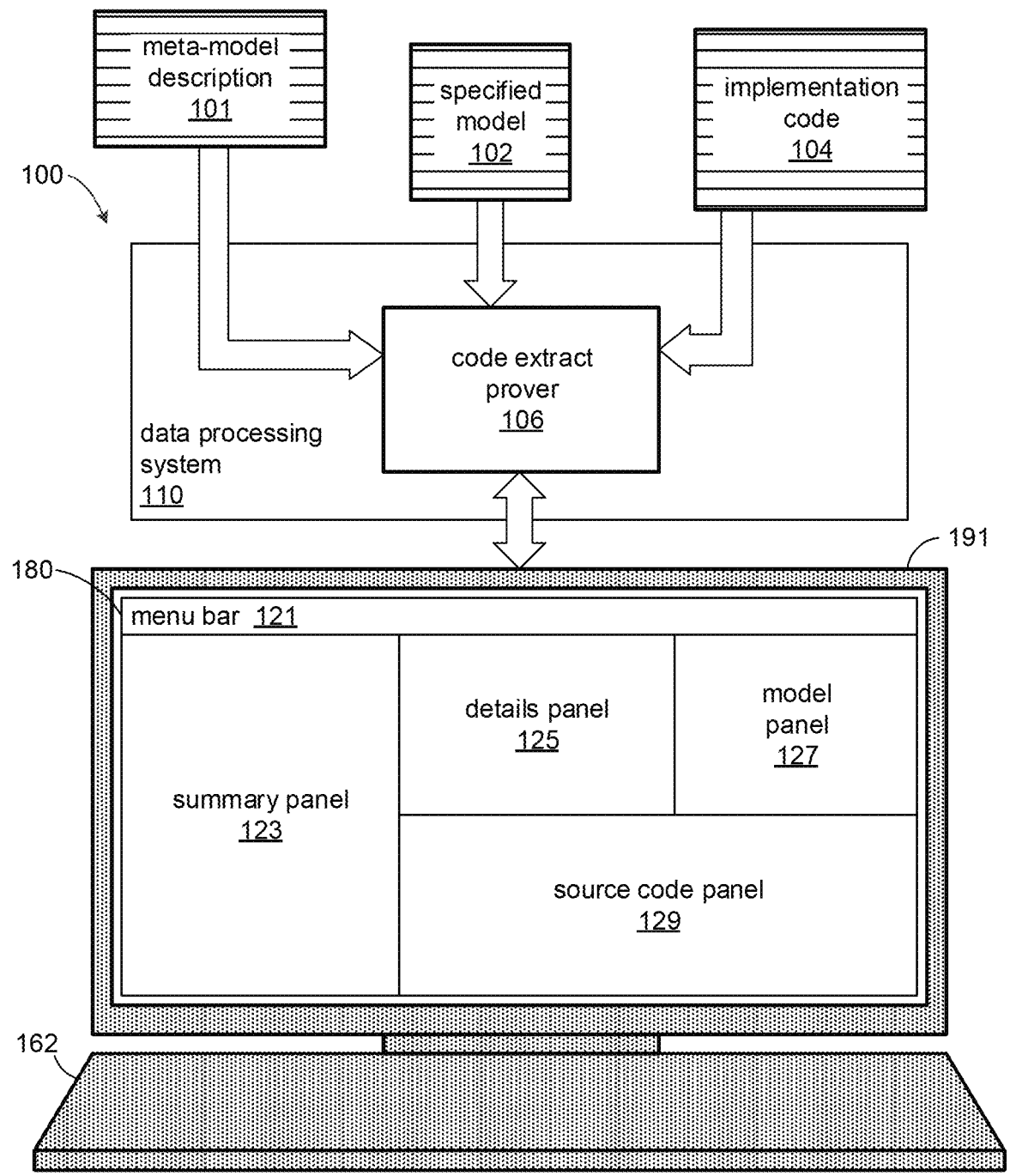
FIG. 1 depicts, in overview, an example of a system for evaluating compliance of an implementation code with at least a specified model, according to some embodiments.

The features and advantages of the present invention will become more apparent from the detailed description set forth below when taken in conjunction with the drawings.

DETAILED DESCRIPTION

Examples of electromechanical dynamic systems relevant to the present embodiments include, but are not limited to, automobiles, avionic instruments, aerospace machines, marine vehicles, power generators, construction machinery, mining machinery, agricultural machinery, and forestry machinery. In some instances, the present embodiments can also apply to complex computational systems. As may be appreciated, integration of modern diagnostic and control electronics into dynamic electromechanical systems, for example, can result in appreciably complex automated or semi-automated control of such systems. In some cases, a system-control code can comprise millions of lines of code, possibly in different computer languages, distributed in thousands of files, as is the case for some modern automobiles. Further, the code may be executed in a distributed processing environment. For example, even within a single modern automobile the distributed processing environment can contain over one hundred microcontrollers and microprocessors executing the system-control code.

To aid in development, manufacturing, and servicing of such systems, manufacturers or representatives from the relevant industries may collaborate on methodology by which implementation codes are structured to control such complex systems. One such collaboration is among automotive manufacturers, their suppliers, and companies from the electronics and software industries. The collaboration has resulted in the development of the Automotive Open System Architecture known as AUTOSAR. AUTOSAR was originally developed as a software architecture specification that places restrictions on how computer code may be implemented in system control of automobiles, though the specification has been adopted for other types of machinery listed above. An objective of AUTOSAR is to make development of implementation code by system-control engineers essentially independent of the underlying hardware infrastructure rather than having implementation code that is highly specialized to the underlying hardware. This allows transferability of the code to any hardware that complies with the AUTOSAR specification. By adhering to the software architecture specification (also referred to herein as a meta-model or meta-model description), a system engineer may develop code that determines the behavior of various physical components (e.g., sensors, actuators, microcontrollers, motors, etc.) in the system with little or no knowledge about communication and operation details of the physical components.

Although AUTOSAR is described herein as an example software architecture specification, the embodiments are not limited to AUTOSAR. Exemplary embodiments can also be implemented with other meta-models, such as Unified Modeling Language (UML), Systems Modeling Language (SysML), guidelines developed by the Motor Industry Software Reliability Association (MISRA), Common Object Request Broker Architecture (CORBA), real-time CORBA, Advanced Architecture Description Language (AADL), Software Communication Architecture, and Assembly Line Diagnostic Link (ALDL) among others. A meta-model description can provide informational guidelines, rules and definitions for a modeling language. For example, a meta model description 101 can provide rules and definitions about how corresponding specified models can be formed to comply with a software architecture, and may further dictate how corresponding implementation code is structured to comply with the specified model and, in some cases, with the meta-model. A specified model may comprise one or more files that specify behavior of software components. Implementation code for these software architecture specifications, or meta-models, can be checked for compliance with at least the corresponding specified models using methodology and systems described in further detail below and suitably adapted for a particular specification.

A programmer developing implementation code for systems that adhere to a meta-model must address additional levels of conformity for the code. In addition to writing code that is free of coding standard violations (e.g., syntax errors, division by zero, stack overflow, non-initialized pointer, etc.), the programmer must prepare code that will conform with the dictates of the meta-model in form and, in some cases, in function when executed. Although standard code compilers may catch some of the coding standard violations, compilers have no knowledge of a meta-model or specified model formed therefrom and therefore are not useful for evaluating compliance of implementation code with a specified model or a meta-model. For complex systems that require more than a thousand files containing over a million lines of code, the task of adequately evaluating implementation code for compliance with at least a specified model is insurmountable for a programmer. Failure of the code during system operation may be unacceptable or dangerous in some cases with machines that generate large forces, so that post-installation code debugging is not an option.

The inventor has recognized and appreciated that prior to the embodiments described in this application, there has been no reliable and efficient way to adequately prove implementation code is in compliance with at least a specified model formed according to the constraints of the meta-model prior to launching the code in a system. In an example system, a specified model can describe functionalities associated with control of a vehicle's engine (e.g., fuel injection, air intake, revolution speed monitoring, temperature, etc.), and the implementation code can be corresponding software code developed by a programmer to deploy on the physical system to implement the described functionalities for engine control. For safety considerations, it may be desirable to evaluate the integrity of the implementation code quickly and accurately during or after development and before installation on a complex, dynamic system. In embodiments, the implementation code should comply with at least the specified model, in form, and sometimes also in function (e.g., run-time operation), as well as be free of coding standard violations prior to installation of the code in an actual system. Compliance in form may require, for example and without being limited to, completeness of the implementation code (e.g., every functionality of the specified model has a corresponding part in the implementation code), adherence to naming conventions or file definitions imposed by the meta-model, correct numbers of attributes for functions, correct numbers of error codes allotted for a function. Compliance in function may require, for example and without being limited to, operating within ranges defined in the specified model and/or meta-model and operating in a correct sequence imposed by the specified model or meta-model. If the implementation code is not adequately checked prior to launch, a technical result may be operation of the executable code outside a safe regime, potentially creating a dangerous situation for a machine controlled by the code.

The inventor has recognized and appreciated that a tool for evaluating compliance of implementation code with a specified model can greatly improve system development and increase safety of system operation. The described embodiments relate to a code-proving system and methods that can perform automated evaluation of complex implementation code (e.g., over a million lines of code) for compliance in form, and optionally in function, with a specified model, and optionally with the meta-model, in reasonable amounts of time (e.g., tens of minutes or less). The code-proving system can quickly and visually identify to a user where in the source implementation code mismatches occur between the implementation code and specified model and/or meta-model and provide a reason for each detected non-compliance. The location in the implementation code and the reasons for non-compliance can be provided, for example, by maintaining links between a code part in the source implementation code and a provable data construct derived from a specified model for the implementation code and associated with the code part, and in some cases from constraints imposed by the meta-model. To increase the confidence and accuracy in results from the automated analysis, the code-proving system can be adapted to perform multiple levels and types of compliance checking, which may include any combination of physical level checks (e.g., checking allowable real values and units), software level checks (e.g., checking consistency of data types and semantics between provable constructs derived from a specified model and the corresponding software representations), execution order checks, and error-handling checks. In some cases, the multiple levels and types of compliance checking can be determined from one or more of the specified model, the implementation code, and the meta-model. To increase the speed of analysis and reduce the required processing power of the code-proving system, the code-proving system can be adapted to parse the implementation code into code extracts based on information from at least the specified model and perform analysis of each code extract individually. The code-proving system can further perform static analysis of a code-extract's run-time behavior using function stubs generated for the implementation code that abstract away underlying layers (e.g., run-time environment and basic services layers for an AUTOSAR application, for example) of the implementation code.

In overview, FIG. 1 depicts aspects of a code-proving system 100 that can be implemented to evaluate compliance of implementation code 104 with at least a specified model 102, in addition to optionally performing other code-checking functionality. A code-proving system 100 can comprise a specially-adapted data-processing system 110 that is in communication with input/output devices such as a display 191, on which a graphical user interface can be rendered, keyboard 162, and mouse (not shown). In some embodiments, the display 191 can comprise a touch-screen display and a keyboard 162 may not be present.

In embodiments, the data-processing system 110 is adapted to receive a specified model 102 that, among other things, identifies one or more functionalities to be performed by at least a portion of a system-control code that is to provide automated or semi-automated control of a dynamic system. The dynamic system can be a complex electromechanical system in which there are networked electronic components, as described above. At least some of the electronic components include processors and are configured to communicate with other electronic components over the network. In some cases, the dynamic system can be an infotainment system, a data acquisition system, or a machine intelligence system. The specified model 102 may be prepared by a systems engineer who designs alone, or in collaboration with others, the system-control code. The specified model 102 may be prepared to comply with an over-arching meta-model description 101 that can place constraints on how the specified model 102 is formed, how the implementation code 104 is structured from the specified model, as well as how the system-control code is structured. In this regard, a specified model 102 may be viewed as a specific instance of a meta-model that is prepared using the concepts that are defined in the meta-model. A specified model 102 can comprise one or more data structures (also referred to as model segments) that describe, among other things, functionality of one or more corresponding implementation code segments that can be developed from the specified model. A specified model 102 can also comprise information about specific functions, interfaces, ports, and their attributes that one or more implementation code segments, produced from the specified model, use to execute functionality and interact with other code segments executing in the system. A specified model 102 may include descriptions for one or any combination of the following model segment types: time-based model segment, state-based model segment, event-based model segment, and dataflow-based model segment. There can be one or more model segments (e.g., corresponding to "software components" for an AUTOSAR application, for example, or "components" in other software architecture specifications) that make up a specified model 102. A model segment can define one or more operations, when implemented as code, that it provides to an executing system-control code. A model segment can additionally or alternatively define one or more operations it requires from the system-control code. As one example, a specified model may comprise a combination of the following model segments for control of a back-up power generator: a grid status segment, an automatic start in response to a grid fail signal, an automatic shut-down in response to a grid normal signal, a safety shut-down in response to overcurrent. A grid status segment can provide an operation of sensing power on the utility grid to determine if power is being supplied normally, and provide a status signal for use by system-control code of the back-up power generator. An automatic start segment can require from the system-control code an operation of posting a current grid status signal to its interface, which it can monitor periodically to determine whether it should activate the back-up power generator. Model segments may define the behavior of all or a portion of control for a dynamic system.

Each model segment can include one or more model parts (corresponding to "runnables" for an AUTOSAR application, for example, or for example, "functions" or "executables" in other architectures). A specified model 102 may be prepared in any suitable manner, for example, by direct coding in a computer language or by filling out templates that guide the writing of a specified model. As one example, templates are available for AUTOSAR that can be filled out to produce one or more AUTOSAR extensive mark-up language (ARXML) files for a specified model 102. For an AUTOSAR application, for example, the ARXML files describe behavior of software components that are implemented as software code (e.g., C, C++, or any other suitable code). The software code, when executed, interfaces with physical components (e.g., electronic control units (ECUs) such as oil sensor, fuel sensor, speedometer, brakes, fuel delivery and ignition, etc.) in an automotive system. A physical component may comprise an electronic component that is configured to communicate with at least one other electronic component in a networked system of physical components, such as occurs in modern vehicles. A specified model 102 can specify behavior of the software components so that they perform a desired functionality such as, but not limited to, sensing oil level, estimating oil life, estimating fuel range, antilock braking, automated cruise control, etc. In a machine-learning application, a specified model 102 may specify behavior of software components that perform functionality such as, but not limited to, acquiring data, filtering data, performing statistical analysis of data, accumulating data records, performing pattern recognition, executing a predictive algorithm etc.

The data processing system 110 can also receive information pertaining to a meta-model description 101 or be programmed with information relevant to a meta-model which can provide guidelines for forming the specified model 102 and a corresponding implementation code 104. The meta-model description 101 may define a language or schema for writing the specified model 102 as a collection of model segments and interfaces between the model segments. The specified model 102 may make explicit the operations and data that the model segments provide to and require from each other. The meta model 101 may further define rules that dictate the structure of the implementation code 104. As a non-limiting example for an AUTOSAR application, the meta-model description 101 can comprise rules for including specific header files at specific levels of the code include hierarchy, where the header files have names and contents that are imposed to comply with an implementation code build process that is specified by the meta-model description 101. In some cases, the meta-model may further define requirements on the implementation and configuration of underlying run-time execution services (e.g., scheduling, memory-management, communication, etc.) that are used for execution of the implementation code 104 on a dynamic system comprising one or a network of processing units. The meta-model information can include, for example, identification of specific functions and their attributes permitted for use in implemented code and/or identify attributes of interfaces and ports permitted for use in the implemented code. The information included in the meta-model description 101 may also include descriptive language about parts of the meta-model, e.g., text explanations associated with permitted functions and their attributes. In some cases, the meta-model description 101 or specified model 102 can also include information relevant to hardware features used in a physical system (e.g., allowed native data representation attributes, data IO access protocols, data link attributes, etc.).

In embodiments, the data-processing system 110 is also adapted to receive implementation code 104 that is to be evaluated for compliance with at least the specified model 102. In some cases, the implementation code 104 can be a portion of a system-control code that is eventually deployed for complete operation of a dynamic system. In some cases, the implementation code 104 can be the entire system-control code. The implementation code 104 can comprise one or more files of source code and further include related files (e.g., header, library, and/or data files needed by the implementation code 104). In some implementations, the implementation code may comprise at least one script or code snippet. In embodiments, at least a portion of the implementation code 104 corresponds to at least a portion of the specified model 102 and comprises code that, when executed, performs functionality identified by the corresponding portion of the specified model 102. The implementation code can contain code segments that correspond to model segments defined in the specified model 102, and further include code parts that correspond to the model parts defined in the specified model 102. In some cases, the implementation code 104 may be prepared without a corresponding specified model 102 and is written to comply with the meta-model information 101.

The implementation code may be prepared by an entity other than the entity that prepared the specified model 102. For example, preparation of the implementation code 104 can be done by a programmer at the request of an engineer who developed the specified model 102. The implementation code may be hand-written, or at least a portion of the implementation code may be automatically generated from the specified model 102, (e.g., using a code-generation tool such as DaVinci Developer, available from Vector Informatik GmbH of Stuttgart, Germany or Embedded Coder® available from The MathWorks, Inc. of Natick, Mass.). The implementation code 104 can be written in one language or can comprise files written in multiple different languages. Exemplary languages include, but are not limited to, C, C++, C#, assembly code, Java, Ada, structured text for execution on a programmable logic controller (PLC), and hardware description language (HDL). In some cases, at least a portion of the implementation code 104 can be code generated in a technical computing environment such as code generated from a graphical programming environment such as the Simulink environment. In some cases, the implementation code 104 can be encrypted when received for proprietary and/or security reasons and subsequently decrypted by the code-proving system 100 for analysis. A user or customer would provide a key for decryption of encrypted implementation code.

The data-processing system 110 can also include a code extract prover 106 that is adapted to receive the meta-model information 101 and/or specified model 102 and implementation code 104 and evaluate the implementation code 104 for compliance (sometimes including run-time compliance) with the specified model 102 and/or meta-model information 101. In embodiments, the code extract prover 106 comprises programming instructions executing on hardware comprising logic gates and registers arranged as sequential logic circuits. The executing instructions and hardware operate to extract portions from the implementation code 104 that correspond to at least one model segment, and evaluate the extracted code for compliance with provable data constructs generated from the specified model 102 and/or meta-model description 101. According to some embodiments, a code extract prover 106 can additionally analyze a code extract for coding standard violations. Example programming instructions that can be adapted for use as part of a code extract prover 106 in the code-proving system 100 is the Polyspace Code Prover™ software available from The MathWorks, Inc. of Natick, Mass. Further details of a code extract prover 106 are described below.

During analysis of the implementation code 104, information about the analysis can be provided for display as a graphical user interface 180, depicted generally in FIG. 1, according to some embodiments. Other display arrangements can be used in other embodiments to convey results from the code extract prover 106. As only one example, several panels can be displayed on the user interface 180 that provide reasons for and/or details about compliance and non-compliance (if any) of code parts of the implementation code with at least the specified model 102. The user interface 180 can include a menu bar 121 for navigating to and selecting different functionality of the code-proving system 100. The user interface 180 can include a summary panel 123 that provides a brief synopsis of the analyzed implementation code, a details panel 125 that provides information about a particular meta-model or specified model violation (e.g., why a particular code part does not comply with a corresponding model part), a model panel 127 that provides explanatory information about the portion of the meta-model description 101 or specified model 102 that is relevant to the non-compliance of the code part, and a source code panel 129 that displays a section of source implementation code 104 containing the non-compliant code part. In this manner, the user interface 180 can provide an easily comprehensible summary, facile navigation tool, and visual link between a non-compliant code part, corresponding model part from the specified model 102, and optionally corresponding guidelines from the meta-model description 101, as well as identify a location in the source implementation code 104 of the non-compliant code part. This can aid a programmer in rapidly reviewing and revising the implementation code 104 and/or specified model 102 to bring the implementation code 104 into compliance with at least the specified model 102.

Although the terms "compliance" and "non-compliance" or derivatives thereof are used frequently throughout the discussion of checking the implementation code 104, it should be understood that the terms "match" and "mismatch" may also be used. In some cases, non-compliant implementation code 104 contains a mismatch between an attribute of a portion of the implemented code part, for example, and a corresponding model part or metal-model constraint. The mismatch does not necessarily mean the code part is in error. In some cases, the mismatch can indicate that the specified model 102 needs to be revised. A model part can specify behavior for a particular functionality (e.g., turn on headlights when the windshield wipers are active, disengage cruise control when the brakes are applied, etc.). A model part may have a unique identifier in a specified model 102 and can be formed, for example, as one or more files according to a schema that is described by the meta-model description 101. A corresponding code part can include one or more functions, routines, procedures, runnable (which may be generally referred to as callable units) that, when executed, perform the functionality specified in the corresponding model part. An identifier of a model part used in the specified model may be used to identify a corresponding code part.

Although FIG. 1 depicts relations between the meta-model description 101, specified model 102, implementation code 104, and code extract prover 106 in terms of data flow, a depiction that represents information needed or implicitly known by the various components would show a different arrangement of arrows. In such a depiction and according to some embodiments, the code extract prover 106 would have arrows going from it to each of the meta-model description 101, specified model 102, and implementation code 104 indicating that the code extract prover requires implementation code 104 and information from both the specified model 102 and, in some cases, the meta-model description 101 identifying requirements for forming the specified model 102. Additionally, there would be an arrow going from the specified model 102 to the meta-model description 101 indicating that the specified model 102 implicitly includes information from the meta-model description 101 that dictates how the specified model 102 is formed. Also, there may be arrows going from the implementation code 104 to the specified model 102 and meta-model description 101. For example, the implementation code 104 may be aware of and comply with code structure rules set forth by the meta-model description 101 to implement instances of components and interfaces in compliance with the specified model 102.

Figure 2:
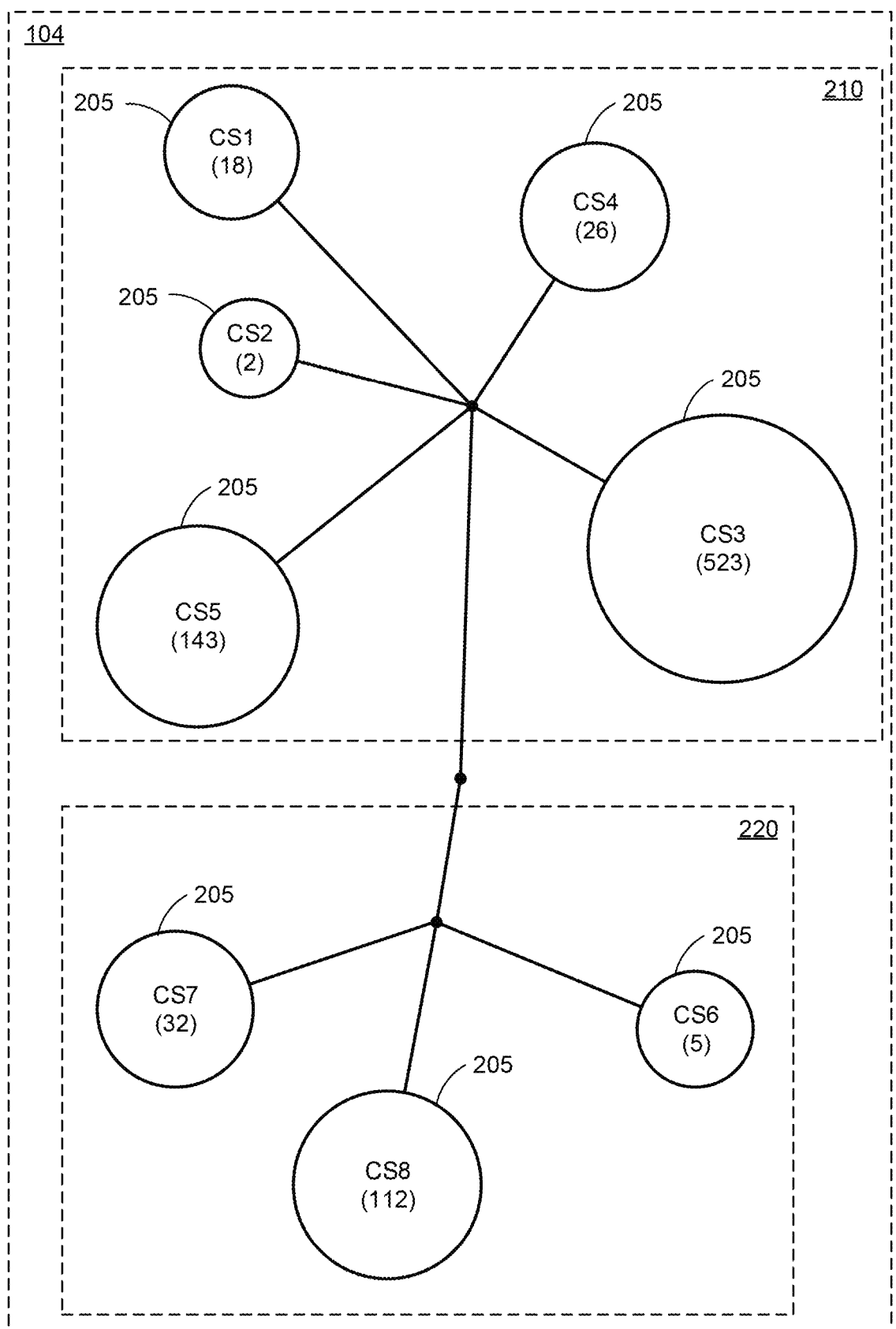
FIG. 2 depicts an example of a constellation diagram of code segments that may be part of a implementation code.
Figures 3, 4:
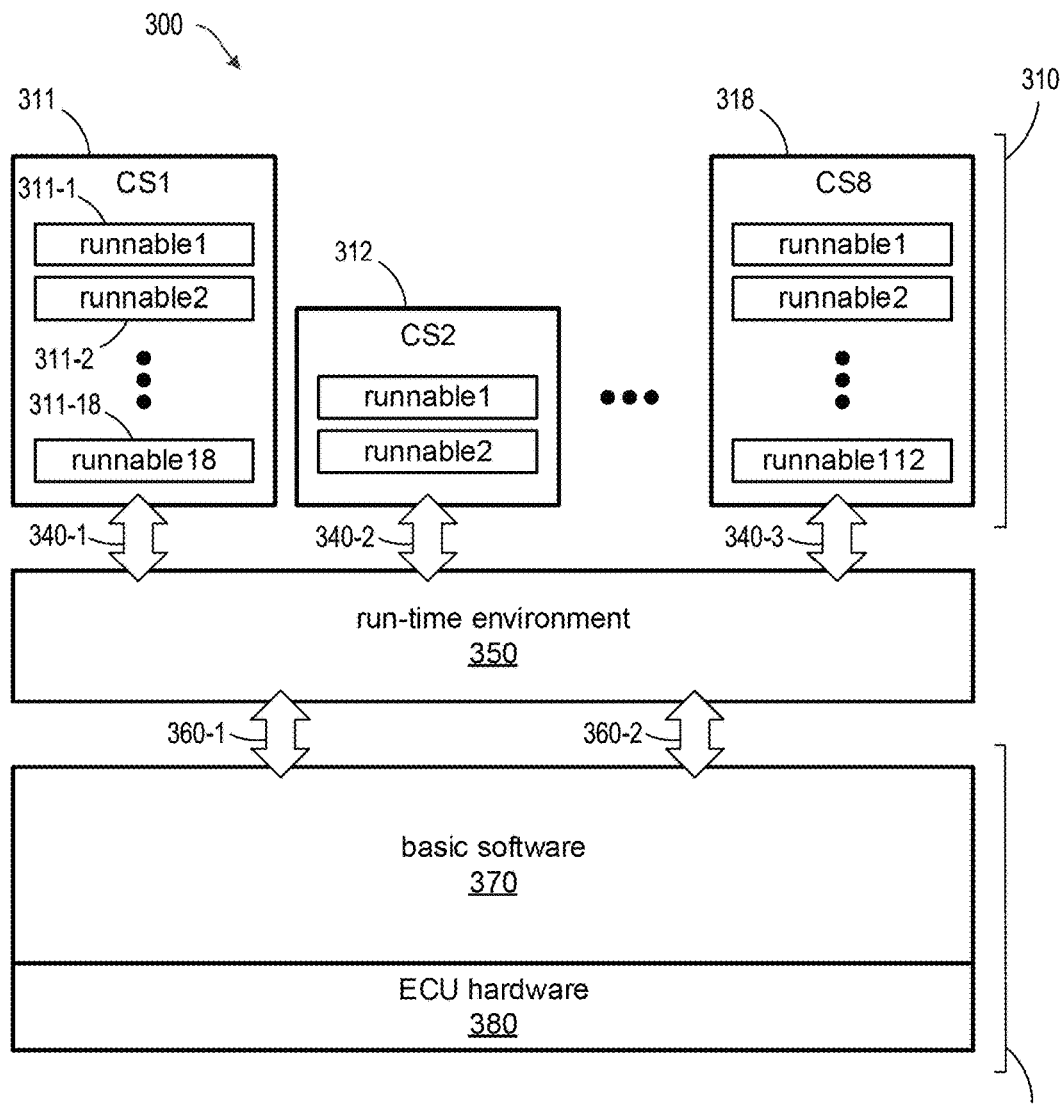
FIG. 3 depicts an example of a multi-layered architecture defined according to one meta-model description.
FIG. 4 depicts an example of pseudo-code that may be included in a software component implementation of an AUTOSAR implementation code, according to some embodiments.

In further detail and referring now to FIG. 2 and FIG. 3, implementation code 104 for controlling some dynamic systems can be significantly complex. FIG. 2 pictorially represents code segments CS1, CS2, CS8 of an implementation code 104 that can participate in automated or semi-automated operation of a dynamic system that adheres to a meta-model. The code segments 205 can comprise blocks of computer code (e.g., C-language files and associated header files) prepared to execute particular functionality (e.g., anti-lock braking, cabin temperature control, wiper motor control) in a system (e.g., automotive system). In some cases, behavior of the code segments 205 can be defined in corresponding model segments of a specified model 102, though some code segments may not have a corresponding model segment. At least some of the code segments may execute mathematical and/or other logic computation. In some implementations, each code segment can include one or more software functions that are executed as part of the segment's computation. In the example of FIG. 2, the number of executable functions for a code segment are indicated in parentheses. In some cases, at least some of the executable functions and their attributes are defined in the specified model 102. In some cases, at least some of the executable functions and their attributes are defined in the meta-model description 101. Although FIG. 2 shows only eight code segments with one code segment CS3 having 523 executable functions, system-control code for a modern automotive system can have over 1000 code segments (called "software components" for AUTOSAR) with a single software component implementing as many as 1000 executable functions. For the purpose of description, executable functions in AUTOSAR are also called "runnables".

For some applications, the code segments 205 can be organized into packages 210, 220 that pertain to different operating aspects of a system (e.g., vehicle braking and cruise control in an automotive application). In operation, execution of any code segment 205 can be dependent upon one or more values produced by one or more other code segments executing within the system. Although there can be interaction between the packages 210, 220 when executing on a system (e.g., stepping on the brakes disables automatic cruise control), the packages can be provided individually to a code-proving system 100 for analysis.

According to some embodiments, the code-proving system 100 can generate cluster diagrams like that shown in FIG. 2 based on information obtained from a specified model 102. For example, the code extract prover 106 can analyze the received specified model 102 and identify definitions of different model segments that, when implemented, correspond to code segments 205. The code extract prover 106 can further analyze the specified model 102 and implementation code 104 to identify a number of executable functions associated with each model segment. In some cases, the code extract prover 106 can further analyze the implemented code 104 to identify a number of lines of code associated with each code segment 205 and/or a number of files associated with each code segment. The number of lines of code can also be listed or otherwise provided for each code segment.

To further add to the complexity and difficulty of the code-proving task, a meta-model description 101 can require a multi-layered software architecture for implementing a system-control code as well as specify methodology by which implementation code 104 is generated for the multi-layered architecture. A multi-layered architecture can include, for example, such software layers as an application layer, a basic services layer, and one or more intermediate layers between the application layer and the basic services layer. FIG. 3 represents a three-layered software architecture 300 required by the AUTOSAR specification for implementing a system-control code. Although for explanation purposes the code-proving system 100 will be described in further detail in connection with the AUTOSAR specification, the invention is not limited to the AUTOSAR specification, as mentioned above. Aspects of determining provable data constructs from a specified model 102 and/or meta-model description 101 and of evaluating code parts for compliance with the provable data constructs can be applied to meta-models other than AUTOSAR which may require single-layer or multi-layer software architectures that can have fewer or more than three layers.

The example AUTOSAR three-layered architecture 300 depicted in FIG. 3 comprises an application layer 310, a runtime environment 350, and a basic services layer 390. For AUTOSAR, the application layer comprises a number of software components 311, 312, 318 that each comprise functionalities for controlling components of an automotive system. Each software component 311 can be associated with a number of executable functions or runnables. The runnables can be identified by naming and/or defining entries in a specified model 102 along with their attributes. For example, knowledge (which may be obtained from the meta-model description 101) of a schema or language required to prepare the specified model 102 can be used by the code-proving system to identify runnables and their attributes. In some AUTOSAR embodiments, implementation code 104 received for proving can pertain to the application layer 310 of AUTOSAR's three-layered architecture 300. In other embodiments, implementation code received for proving can pertain to other layers of the software architecture.

A runtime environment 350 for a multi-layered architecture can comprise code that is generated from knowledge of code in adjacent or other layers of the software architecture. For AUTOSAR the runtime environment 350 is generated, at least in part, from knowledge of the software components 311, 312, 318 in the application layer 310 and from knowledge of basic software 370 in the basic services layer 390. The AUTOSAR runtime environment 350 can include code that is generated in accordance with a methodology specified by the AUTOSAR meta-model. The runtime environment 350 can interact with software components in the application layer 310 through software interfaces 340-1, 340-2, 340-3 (referred to generally as interfaces 340). The runtime environment 350 can also interact with the basic software 370 through interfaces 360-1, 360-2. The interfaces can comprise data ports through which information is exchanged between the different layers of the three-layered architecture 300. In this manner, functionality defined by the software components 311, 312, 318 can be implemented on underlying ECU hardware 380 in the basic services layer 390 without a programmer having to know the particular details about coding for the ECU hardware 380.

In embodiments, interfaces 340 between the application layer 310 and the runtime environment 350 along with interface attributes can be specified in a specified model 102 prepared by a developer and/or in the meta-model description 101. For example, an interface can be identified as one or more locations in memory that stores one or more data structures. A specified attribute can be, for example, a data structure identifying a type of interface (e.g., sender/receiver or client/server for an AUTOSAR application). Another specified attribute can comprise a type of data (e.g., char, int, double, float, etc.) stored at the location. Interfaces can be accessed using pointers in some embodiments. In order to protect some values, the specified model 102 and/or architecture meta-model description 101 can identify the type of interface as read only. Some interfaces can be identified as write only or read/write.

According to some embodiments, a specified model 102 and/or meta-model description 101 can define and/or place constraints on function calls to the runtime environment. For example, a meta-model description 101 can define function names permitted for use in the application layer 310 to invoke functionality in the runtime environment 350, and can also constrain values or ranges of values associated with function arguments. For the AUTOSAR meta-model, there is a restricted set of runtime environment functions that are permitted for use when invoking functionality in the runtime environment 350. Typically, these permitted functions have a name that begins with the "RTE" or "rte" prefix. Attributes (e.g., number of arguments, data types of arguments, range of values permitted for arguments, error codes, function return values, precedence, timing, etc.) for functions in this restricted set may be defined by the AUTOSAR meta-model description 101. Because function names and attributes may be dictated by the meta-model description 101, one who implements code 104 is constrained to use the names and attributes as defined by the meta-model.

Continuing with the AUTOSAR example, the runtime environment 350 can participate in the execution of software components 311, 312, 318 in the application layer 310 and their runnables 311-1, 311-2, ... 311-18. For example, the runtime environment 350 can monitor data present at one or more interfaces 340 of the runtime environment and invoke a runnable of a software component after detecting that certain data is present at one or more interfaces 340. The runtime environment 350 can also routinely execute invocation of certain runnables based only on elapsed time. For example, the runtime environment can cyclically invoke a "speed" runnable to retrieve speed data posted to an interface associated with a speed sensor. In some implementations, the runtime environment 350 can execute a sequence of runnables in accordance with an allowed sequence specified by the specified model 102 and/or permitted by the meta-model description 101. For example, a specified model or the meta-model may identify that an executable function may or may not be preempted once invoked. If a function can be preempted, a local copy can be made of data at interfaces which the function accesses. Data from the local copy can be used subsequently by the function, so that it correctly completes its operation with initial values.

FIG. 4 provides a simplified example of an executable function 400 for purposes of explaining further aspects of the code-proving system 100. FIG. 4 depicts a pseudo-code example of an executable function "rainlights" that may comprise a code part of implementation code 104. For an AUTOSAR application, for example, "rainlights" may be a runnable 311-1 corresponding to a light-control software component 311, for example, that automatically turns on a vehicle's headlights if the windshield wiper motor is activated. Other examples of more complex executable functions and runnables are numerous as will be appreciated by one skilled in the art system control.

For an AUTOSAR application, for example, the identity and behavior of a "rainlights" runnable can be specified in a specified model 102. For example, the specified model 102 can include the name "rainlights" in a definition for a model part that is to be used, or some derivative thereof, for the corresponding function and specify that the function has two arguments that are short integer data types. The specified model 102 may identify a write-only interface to which current values of the wiper motor set point and headlamp set point may be written and that short integer values are to be placed at the interface's corresponding memory locations. The specified model 102 may specify that first argument may have integer values from 0 and 9 and the second argument may have integer values from 0 to 2. The specified model 102 may also specify that if the wiper motor is active, the headlights are to be turned on. The specified model 102 may further specify that the runnable is preemptable and that it is invoked cyclically (e.g., once per second when the vehicle is moving). In some cases, the specified model 102 may specify an order in which the runnable may be executed among other runnables. The meta-model description 101 may define an RTE function "RTE_write_lightport" that is permitted for use by a software component in the application layer 310 to control headlamp settings and that the function has two arguments. The meta-model description 101 may specify that the first argument is a short integer data type and specify the data type of any other arguments for the RTE function. In some cases, the meta-model description 101 may specify an order in which the RTE function may be executed among other RTE functions.

The "rainlights" runnable may be implemented in C-code, for example, as a run-time function of the same name that is executed periodically when the vehicle is in motion. For the illustrated example, the function is written to comply with specifications set forth in at least the specified model 102. For the example shown, if the wiper motor is on (a set point greater than 0) and the headlamps are already on (a set point greater than 0), the runnable takes no further action. Otherwise, if the wiper motor is on, the runnable calls the permitted runtime environment function "RTE_write_lightport" to execute functionality in the basic services layer 390 that will turn on the headlights.

As may be appreciated from the foregoing discussion of an AUTOSAR system, analyzing implementation code 104 for compliance with a specified model 102 and, in some cases, further with a meta-model description 101 can be a complex task. For example, analysis of the implementation code can depend upon values at data interfaces for code segments 205 and code packages 210, 220, action in a runtime environment, as well as action in underlying layers of the meta-model. Compliance checking can comprise, for example, checking whether in selected, or in all, operational scenarios, data ranges and data types of the implementation code remain in compliance with ranges and types specified in at least the specified model 102. Other checks can include checks on error handling and execution sequence.

The inventor has recognized and appreciated that the complexity of compliance analysis can be reduced, which can reduce the amount of processing power need to evaluate the implementation code 104 as well as the amount of time required for the analysis. To accomplish this, the inventor has recognized and appreciated that for some meta-models, the implementation code 104 can be parsed using code analysis and extraction techniques and one or more layers of a multi-layer architecture can be abstracted away. For the case of AUTOSAR, the code segments can be identified in the implementation code 104 for extraction and analysis based on information from the corresponding specified model 102 and knowledge about the meta-model description 101. Also, runtime environment functions are well specified by the meta-model description 101, which defines a limited number of runtime environment functions by name and further defines attributes of these runtime environment functions. Predetermined knowledge of the runtime environment functions can then be used to abstract away one or more layers of a multi-layer software architecture for purposes of code compliance analysis. For an AUTOSAR application, for example, knowledge of the predefined "RTE" functions can be used to abstract away the runtime environment 350 and the basic services layer 390.

Figure 5:
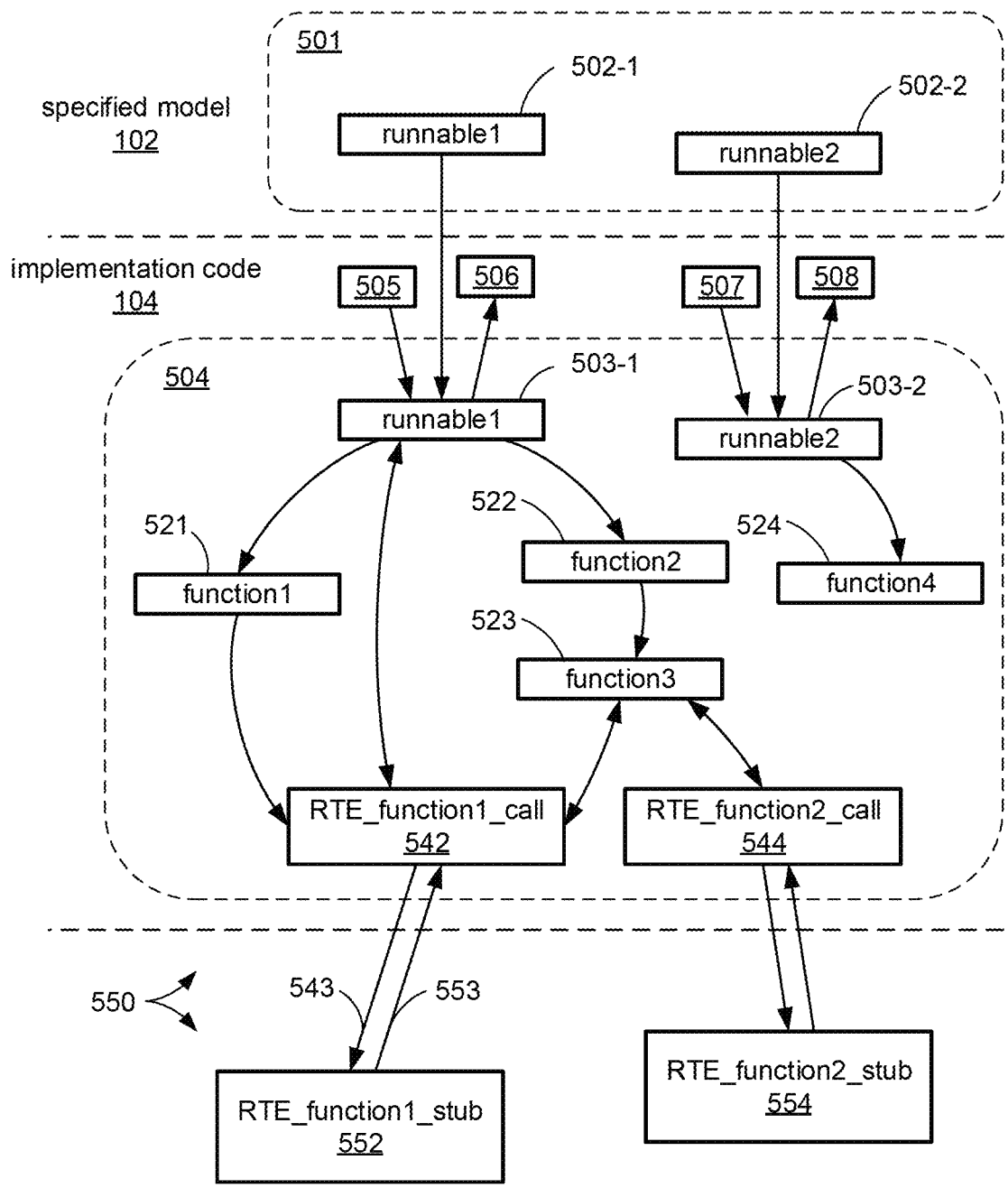
FIG. 5 includes an example of a dependency diagram for a code extract and function stubs that can be used in a unit run-time environment to perform static analysis of the code extract, according to some embodiments.

FIG. 5 depicts a code extract 504 and related items for purposes of explaining code extraction and layer abstraction features of a code-proving system 100 for an AUTOSAR implementation. In this example and referring again to FIG. 3, the code extract 504 is part of implementation code 104 that pertains to the application layer 310 of an AUTOSAR three-layer architecture. The code extract 504 can be at least a portion of an implemented code segment 205 that corresponds to a model segment defined in a specified model 102. To greatly reduce the complexity and increase speed of analysis of the code extract 504, the run-time environment layer 350 and underlying basic services layer 390 can be abstracted away. By abstracting away the underlying layers, details of code associated with the underlying layers can be ignored during code proving.

A code-proving system 100 can analyze a received specified model 102 and identify a specified runnable or model part 502-1 ("runnable1" in the illustration) in the specified model 102 by name. In some cases, the model part 502-1 can be one of many model parts 502-2 that are included in a model segment 501. The specified runnable or model part 502-1 can be used as an entry point into the implementation code for further analysis.

With the name provided for the specified runnable in the specified model 102, the code-proving system 100 can search the implementation code 104 and identify one or more implemented functions 503-1 with the same name, or derivative thereof, in the implementation code 104. The code-proving system can further search, for example, header files that include the corresponding function and identify from the header files one or more additional functions 503-2 that are included for a section of implementation code 104 with the identified function 503-1. In AUTOSAR, the meta-model may dictate that a software component 311 be implemented with an associated header file that includes all runnables associated with the software component. A dependency analysis can then be performed on the implementation code 104 to identify which operation and sub-functions are bound to the code part 503-1. The dependency analysis can be performed automatically by the code-proving system 100 and can use compiler techniques, during which lines of code and sub-functions executed in response to invocation of the code part 503-1 are identified statically. Similarly, lines of code and sub-functions in the implementation code 104 can be identified for other functions 503-2 associated with the model segment 501. In this manner, the code-proving system can identify a code extract 504 corresponding to the model segment 501.

In some instances, it may not be possible to identify implementation code 104 corresponding to model part 502-2. For example, a corresponding code part 503-2 and its sub-functions may be withheld for proprietary reasons. In that case, the code-proving system is configured to identify to a user the extent to which code corresponding to a model segment 501 is proved. As an example, the code-proving system can identify that code corresponding to certain model parts 502-1 have been analyzed and proven and that code corresponding to other model parts 502-2 is not available for proving.

In some cases, at least some of the identified lines of implementation code 104 that corresponds to a model segment 501 can include one or more predefined functions (e.g., the AUTOSAR "RTE" function calls in an AUTOSAR application). These predefined functions can be well defined by the meta-model description 101, which can specify their parameters and ranges of values for the parameters and ranges of returned values. Since properties of these functions are well-defined by the meta-model description 101, function stubs 552, 554 can be formed to represent the action of these predefined functions. For an AUTOSAR application, for example, these function stubs can emulate the action of their corresponding runtime environment functions for purposes of analyzing the code extract 504.

In embodiments, a runtime-environment function stub 552 can comprise a data structure or function that receives data (indicated by data flow 543) from the calling function (e.g., function 542 in the code extract 504) and provides data to the calling function (indicated by data flow 553) that is permitted by and in accordance with the meta-model. In some implementations, the function stub also provides error codes or other attributes to the calling function that are permitted by the meta-model. During code proving, the function stub 552 can check to see that received data is in compliance with data ranges specified for the function stub by the meta-model description 101 and/or specified model 102.

By replacing all the predefined functions 542, 544 invoked in the code extract 504 with function stubs, lower layers of the software architecture (e.g., the run-time environment layer 350 and basic services layer 390, referring again to FIG. 3) can be abstracted away for purposes of proving the code extract 504. That is, details of functionality and code associated with the lower layers need not be modeled to prove the code extract 504. In this manner, a unit runtime environment 550 is created that emulates actual runtime behavior of the system. For an AUTOSAR application, for example, this unit runtime environment 550 comprises an abstraction of the actual runtime environment 350 and the underlying basic services 390 along with the code extract 504 that is being proved. Although termed "unit runtime environment," the code extract 504 can be proved using static analysis, as described further below. Static analysis can include performing one or any combination of abstract interpretation, model checking, and satisfiability solving.

Figure 6:
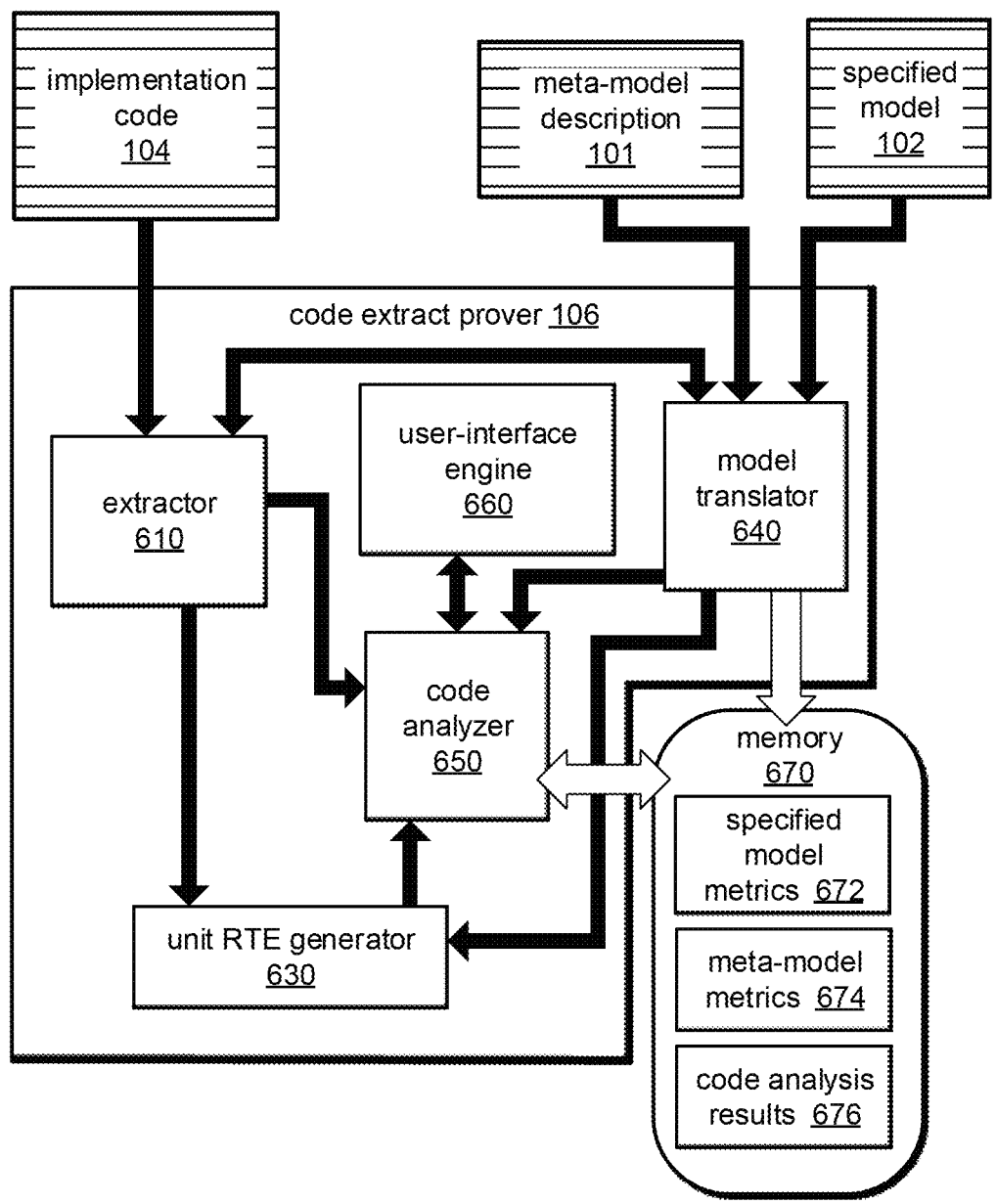
FIG. 6 depicts example components of a code extract prover, according to some embodiments.

Further details of a code extract prover 106 are depicted schematically in FIG. 6, according to an exemplary embodiment. In embodiments, the code extract prover 106 can comprise an extractor 610 configured to analyze implementation code 104 and identify a code extract 504, a model translator 640 configured to analyze a specified model 102, a code analyzer 650, and a user-interface engine 660. The model translator 640 can, in some cases, be further configured to analyze a received meta-model description 101 relevant to the specified model 102 an store information that is useful for code proving in memory 670 as meta-model metrics 674. In some implementations, information relevant to one or more meta-models that is useful for code proving can be previously stored in memory 670 as meta-model metrics 674 (e.g., downloaded from a database containing constructs useful for code proving or otherwise entered into memory 670) and may not be obtained by analysis of a meta-model description 101. In some cases, the code extract prover 106 can further comprise a unit RTE generator 630 that, for example, produces function stubs 552, 554 as described above in connection with FIG. 5. The code extract prover 106 can be in communication with memory 670, which can store specified model metrics 672, meta-model metrics 674, and code-analysis results 676. The specified model metrics 672 and meta-model metrics 674 can include characterizations of data elements, attributes, properties, etc. defined in the specified model or meta-model, as described further below in connection with FIG. 7. Memory 670 can also store a specified model 102 and the corresponding implementation code. The code extract prover 106 can be configured to analyze the specified model 102 and implementation code 104 and determine whether there are any mismatches between the implementation code and the specified model 102 and/or meta-model description 101 or whether the implementation code 104 complies with at least the specified model 102.

Figure 7:
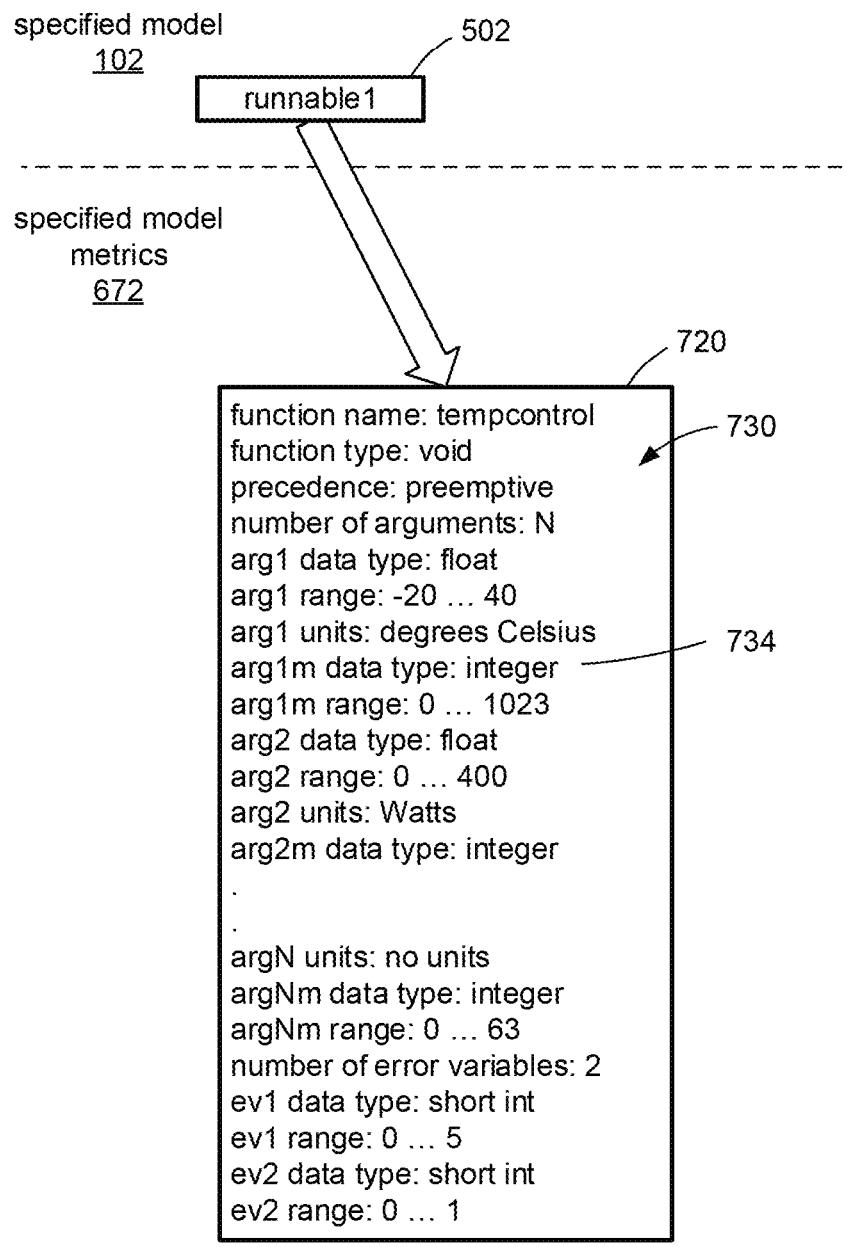
FIG. 7 illustrates an example of provable data constructs that may be generated for evaluating compliance of a code part, according to some embodiments.

The model translator 640 can comprise programming instructions executing on hardware comprising logic gates and registers arranged as sequential logic circuits. The programming instructions, when executed, analyze the received specified model 102 and generate provable data constructs that can be stored in memory 670 as specified model metrics 672. In embodiments, the model translator 640 can analyze the received specified model 102 to identify model segments and their corresponding model parts, such as names or identifiers of executable functions that are to be implemented as one or more code parts, that can be translated into provable data constructs. For each identified model part 502-1, 502-2, various associated properties (e.g., function attributes, ranges for function attributes, units associated with values, error codes, data type mapping, details of data interfaces, etc.) can also be identified from the specified model 102. The model translator 640 can then translate the model part identifier (e.g., function name) and associated properties to a provable data construct 720, an example of which is depicted in FIG. 7. In some cases, translating a model part into a provable data construct can include identifying properties in the model part that can be applied to a callable unit in the implementation code. The properties may include constraints defined in the specified model 102 (e.g., ranges of allowed values, units, allowed arguments, allowed data types, allowed error codes, details of data interfaces, etc.).

A provable data construct 720 can comprise one or more data fields 730 containing data in a format suitable for comparison with corresponding data derived from the implementation code 104 to evaluate compliance of the corresponding code part 503-1 with at least the model part 502-1 identified from the specified model 102. For example, the function name ("tempcontrol" in this example, function type, and precedence (e.g., whether or not the function can be preempted) can be translated into a suitable data format that is included in the provable data construct 720. A number of arguments (e.g., arg1, arg2, . . . argN) used by the function can also be translated and stored with the data construct 720. For each argument, the data type, range of permitted values, and units associated with the range of values can also be translated for inclusion with the provable data construct 720. In some cases, there can be one or more variables associated with error codes returned for a function that are translated and included as data fields 730 with the provable data construct 720 (e.g., data fields associated with "ev1" and "ev2" in FIG. 7). Allowable error codes can be defined by the specified model 102 and/or meta-model description 101.

In embodiments, the translation from a specified model 102 to a provable data construct 720 can comprise representing the various attributes in the provable data construct 720 in a format that is compatible with the computing language of the implementation code 104 and storing the translated expressions as a data construct 720 in memory 670. In some cases, the specified model 102 can also specify a target implementation code language for each code segment 205. Provable data constructs 720 can be generated by the model translator 640 for each provable code part identified from the specified model 102. The provable data constructs 720 can be stored in memory 670 as specified model metrics 672.

In embodiments, the translation of the specified model 102 and/or meta-model description 101 can further include identifying a mapping of first data types and physical values described in the specified model 102 or meta-model description 101 to second data types and values in the implementation code 104. The mapping can be based, at least in part, on an analysis of a code part identified by the extractor 610 to be associated with the corresponding model part of the specified model. For example and referring to FIG. 7, a specified model 102 can express a parameter (arg1) of a function in a model part as a floating-point data type, for example, representing a physical value (e.g., temperature, angle, speed, etc.). The specified model can also indicate units for the physical value (e.g., degrees Celsius, radians, revolutions per minute) and may also define a range of allowed values for the parameter (e.g., 0≤angle≤2*pi for an angle). In some instances, a programmer may be limited by hardware on a dynamic system to using unsigned or signed integers of a certain size, for example, and use an integer data type (e.g., an 8-bit signed integer) in implementation code 104 to represent the function's parameter. The implementer may define a second range (e.g., 0 to 127) in the implementation code that represents the corresponding floating-point range. In embodiments, the model translator 640 can use information obtained by the code extractor 610 during review of the implementation code to determine a mapping between values and data types described in the specified model 102 and their corresponding values and data types implemented in the implementation code 104. The model translator 640 can record an indication of mapping (e.g., "arg1m data type" and "arg1m range" data fields) in the provable data construct 720, or in association with the provable data construct 720, for each mapped data type. The code analyzer 650 can then use the mapping information from the provable data construct to determine whether values passed to or sent from a function are in compliance with mapped data types as well as determine whether the values are in compliance with mapped ranges. In embodiments, the model translator 640 can also record units associated with a physical value that may be defined in the specified model 102.

In some implementations, memory 670 can further include meta-model metrics 674 comprising provable data constructs that are derived from the meta-model description 101 to which the specified model 102 and/or implementation code 104 are/is intended to comply. For an AUTOSAR application, meta-model metrics 674 may comprise provable data constructs for runtime environment "RTE" functions and data interfaces that are defined by the AUTOSAR specification. An RTE function provable data construct can have a similar structure and data entries to that shown in FIG. 7. A provable data construct for an RTE interface or other interface can include a number of data ports, a type of each data port (providing data or requiring data), and a type of interface (client or server). Meta-model metrics 674 can be obtained in the same manner as model metrics 672 or retrieved from an entity promulgating a meta-model.

Referring again to FIG. 6, the extractor 610 can comprise programming instructions executing on hardware comprising logic gates and registers arranged as sequential logic circuits. The programming instructions, when executed, analyze the implementation code 104 to identify and extract code corresponding to a model segment 501 for compliance analysis, as described above in connection with FIG. 5. In embodiments, the extractor 610 can search implementation code 104 (e.g., search header files and lines of code) for code parts 503-1, 503-2 that correspond to a model segment 501 identified in a specified model 102. Using this information along with information from the meta-model description 101 about how implementation code 104 is produced from the specified model 102 and, in some cases, compiler information, the extractor 610 can automatically identify code parts 503-1, 503-2 within the implementation code 104 that are relevant to the model segment 501. The identified code parts may comprise a portion or all of a code segment 205 that was prepared by a programmer based on the model segment 501 defined in the specified model 102. The extractor 610 can designate the identified code parts and associated sub-functions as a code extract 504 which may or may not be extracted from the implementation code for compliance analysis. A code extract can contain at least one code part and can further include dependencies of the at least one code part. Since the compliance analysis can comprise static analysis of the code, it is not necessary to extract or replicate portions of the implementation code 104 for code proving. In some cases, the extractor 610 can record line numbers of code relevant for each code extract 504.

As a further detailed example in the context of AUTOSAR, the extractor 610 can receive information from the model translator 640 that identifies a named model segment in a specified model 102 (e.g., an AUTOSAR software component named "headlight_control"). The meta-model description 101 may dictate a methodology that various properties (e.g., constraints on values, associated functions, and/or software interfaces) associated with the named model segment are written to one or more header files in implementation code bearing a derivative of the same name, for example. The extractor 610 can then, using compiler techniques and/or information from the meta-model description 101 and specified model 102, look for parts of the implementation code 104, such as files and/or functions (and portions of the code that use the functions), that include the one or more header files and extract these portions of implementation code 104 for compliance analysis. As part of the extraction process, the extractor 610 can perform dependency analyses, as described above in connection with FIG. 5, and identify one or more functions 522, 524 that are predefined by the meta-model description 101. These predefined functions can be interpreted by the code extractor as a stopping point or boundary for further dependency analysis. The RTE generator 630 can generate function stubs 522, 524 for the predefined functions identified by the extractor 610, which are used to abstract away code corresponding to underlying software layers, as described for FIG. 5. Functions that are identified for stubbing can comprise part of the boundary or perimeter of responsibility of the code extract 504. In some cases, the extractor 610 can keep a record of lines of implementation code 104 that have been designated for extraction and identify lines of implementation code that have not been designated for extraction during evaluation of the implementation code 104. Lines that have not been designated for extraction can be identified as code that is not reachable by model segments identified by the model translator 640. Lines of code identified as unreachable may not be subject to static analysis checking, but may be checked for coding standard violations. In some cases, unreachable code may not be subject to any checking.

Although unit RTE generation of RTE function stubs can be employed in some cases when extracting code for proving above the RTE layer, other embodiments may not generate RTE function stubs. For example, code proving can be performed on the RTE layer (run-time environment 350 in FIG. 3) or layers below the RTE layer. In a similar manner as described above, relevant code portions can be designated for extraction from the implementation code 104 pertinent to model segments for the RTE layer or underlying layers for code proving. The extraction can be based on knowledge of the meta-model description 101, a specified model 102, and use of compiler techniques to identify the relevant code portions for extraction.

Once a code extract 504 is prepared, the code analyzer 650 can operate on the code extract 504 to evaluate compliance of the code extract with a corresponding model segment 501 identified from the specified model 102. Evaluation of compliance of the code extract 504 can comprise applying data values 505, 507 that span ranges of allowed values defined in the specified model 102 to one or more code parts 503-1, 503-2 of a code extract 504, and evaluating their effect on code within the code extract 504. The code analyzer can calculate all values along a dependency data path from a code part 503-1 to a function stub 552 and back to the code part 503-1 for each applied value 505, for example, when evaluating the code extract 504. The evaluation can comprise static analysis of the code, and optionally can also include checking the code for standard coding violations. Static analysis of the code can include using abstract interpretation techniques to verify all possible execution paths of the code, but does not involve executing the implementation code. In each step of the process arguments passed to functions, return values, and error codes, for example, can be checked against allowed values and ranges stored as data fields 730 in one or more provable data constructs 720 in specified model metrics 672. For predefined functions 552, 554, arguments passed from a function call 542, 544 can be checked against corresponding allowed values in the meta-model metrics 674. Any attributes found to be out of compliance with the specified model metrics 672 and/or meta-model metrics 674 can be provided by the code analyzer 650 for display to the user-interface engine 660 and/or for storage in code-analysis results 676 as mismatches between the implementation code 104 and the specified model 102 and/or meta-model description 101. Additionally, the code analyzer 650 can identify the number of lines of code that were checked in the code extract that did not contain mismatches or that were deemed in compliance and provide this result for display to the user-interface engine 660 and/or for storage in code-analysis results 676. Additional checks that can be performed by the code analyzer 650 include, but are not limited to, division by zero, illegally dereferenced pointers, invalid use of standard library routines, non-initialized variables or pointers, stack overflow, and out-of-bounds array indices.

Static analysis of implementation code 104 can be understood in further detail referring again to FIG. 5. In embodiments, a model part 502-1 identified in the specified model 102 can have an associated range of values that are specified for use in the corresponding code part 503-1. The code analyzer 650 can apply to the code part 503-1 sequential values that fall within the permitted range. The code analyzer 650 can then analyze affected operations and sub-functions 521-523 of the code extract 504 for each seed value applied to the code part 503-1. The process can be performed for each code part 503-1, 503, 2 of the code extract. In some cases for AUTOSAR, the effects of the seed values can propagate down to one or more runtime environment function calls 542, 544, for which the behavior is defined by the meta-model description 101. In some implementations, for each RTE function call 542, 544, the code analyzer 650 evaluates arguments passed to the RTE function stubs for compliance with the meta-model description 101, for example. The code analyzer 650 can further analyze statically return values from the RTE function stubs 552, 554 to the code extract 504 for compliance. Return values from the RTE function stubs 552, 554 can then propagate through the code extract 504 to generate one or more return values for the code parts 503-1, 503-2, for example 502. The code analyzer 650 can then check to see whether the one or more returned values comply with the provable data constructs translated, and in some cases mapped, from specified model 102. As explained above in connection with data-type mapping (e.g., floating point radians mapped to signed integer values for an angle), some physical values defined in the specified model can be mapped to other data type representations and values implemented in software, which can be stored in a provable data construct 720. The code analyzer can check values determined from static analysis of the code extract 504 with the mapped values for compliance.

Although FIG. 5 schematically depicts portions of code associated with one code extract 504 (which may include more code parts 503-1, 503-2 and sub-functions 521-524 than shown in the illustration) that can correspond to one model segment 501, the code extract prover 106 can automatically and sequentially extract for compliance analysis other portions of the implementation code 104 that can be identified by the model translator 640 as being associated with other model segments of a specified model 102. In this manner, the code extract prover 106 can analyze a large implementation code base on a segment-by-segment basis rather than having to handle all of the implementation code simultaneously. This can reduce the amount of processing power needed to analyze the implementation code 104.

In some implementations, the code analyzer 650 can analyze a code extract 504 for compliance with specified model metrics 672 and/or meta-model metrics 674 at several levels, which may be referred to as the "physical level", "design level", and "internal representation level". The internal representation level may also be referred to as the "software" level. For example, the code analyzer 650 can check for consistency between these levels. Such multi-level checking can increase confidence in compliance analysis of implementation code 104, and provide a useful aid to both system developer and programmer whom respectively prepare a specified model 102 and implementation code 104.

For example, a first level of analysis (referred to as a "physical level") can comprise analyzing the specified model 102 and/or meta-model description 101 for physical values, ranges, and optionally units, of various attributes that can be used for one or more functions defined by the relevant model and recording the physical values, ranges, and optionally units, in a provable data construct. Referring to FIG. 7, values, a range of 60 degrees, and units (Celsius) can be identified as attributes of a function for a model segment 501 (e.g., attributes identified for a parameter "arg1"). Another example, might be a parameter or variable that is specified as an angle having a range of 0 to 360 degrees. The specified model may further identify an intended data type for the parameter or variable (e.g., float, double, fixed-point, integer, short integer, M-bit integer, etc.) to be used for implementation of the parameter or variable in the implementation code 104. As an example, a designer may specify an integer data type for an implemented variable, so that the code can run on a wide range of microprocessors. Alternatively, a designer may specify a float data type for an implemented variable, so that the code can run on more powerful microprocessors. At least one or more of the intended data type, range, and units can be recorded in a provable data construct 720 for later comparison with values obtained from the corresponding part of the implementation code 104.

Compliance analysis at the physical level can comprise comparing values from the corresponding part of implementation code for compliance with values and/or ranges recorded for a provable data construct 720 for consistency. Such consistency checking may comprise mapping data values and types from the implementation code to corresponding data values and types defined in the specified model 102 and recorded in a provable data construct 720, or vice versa. For example, if a range of 0 to 360 degrees is intended to be represented in implementation code using an 8-bit integer, compliance analysis may comprise determining that the full range of 0 to 360 degrees is adequately covered by the corresponding 8-bit integer variable, and additionally checking static analysis results to determine that computed values fall within the 8-bit integer range of values. Compliance analysis at the physical level can also comprise analyzing the corresponding part of implementation code to detect compliance with units recorded in the provable data construct 720. In some embodiments, the units comprise a semantic check on the implementation code. Continuing with the example shown in FIG. 7, a part of implementation code that indicates to a user an ice condition below 32 degrees can be detected by the code analyzer to be out of compliance with the specified model 102, because the units are not matched (e.g., Celsius described in the specified model vs. Fahrenheit indicated in the implementation code). As another example, a range of angles may be expressed for a variable in radians in the specified model 102 (e.g., between 0 and 2*pi), and the code analyzer determines from analysis of the implementation code 104 that corresponding mapped values extend to values that greatly exceed 2*pi (e.g., ranging between 0 and 360). The code analyzer 650 can then report an over-range non-compliance and can also indicate a mismatch in units between a model variable and its corresponding implemented variable. In some cases, units of variables can be indicated in comments within the implementation code 104, which can be detected by the code analyzer 650. The code analyzer 650 can detect discrepancies at the physical level in values and/or units between the implementation code 104 and values and/or units recorded in provable data constructs determined from the specified model 102 and/or meta-model description 101. Any discrepancies can be reported to a user interface and/or stored in code-analysis results 676.

A second level of analysis (which may be referred to as the "design" level) can comprise determining how a physical value specified in the specified model 102 is intended to be mapped to a particular data type (e.g., fixed point or floating point) for the implementation code 104. For example, the specified model 102 or meta-model description 101 can specify that a variable defined in the specified model 102 is to be mapped to a certain data type for implementation in the implementation code 104. For example, a developer of the specified model 102 may specify that a parameter should be implemented as an 8-bit integer data type, so that a function using the parameter can execute on a broad range of microcontrollers that may be used in a dynamic system. In AUTOSAR, for example, such data-type mapping can be defined in an internal behavior specification for a software component to map a physical value (referred to as ApplicationType) from the physical level to an intended implementation representation (referred to as ImplementationType). Such mapping of physical values described in the specified model 102 can be detected by the model translator 640.

Information associated with mapped values or ranges can be recorded in a provable data construct 720 for later comparison with data type and/or values obtained from the implementation code 104. Referring again to FIG. 7, a physical value "arg1" data-type mapping 734 to an intended implementation data type may be a 10-bit integer.

Compliance analysis at the second level can comprise checking the data-type mapping to determine whether or not data-type mapping exists for all variables and parameters to be mapped, and whether or not an intended implementation data type adequately represents its corresponding physical value. For example, if the physical value spans a large numerical range (e.g., −2,000 . . . 10,000) and the intended data type is an unsigned 8-bit integer, the model translator 640 can record or indicate non-compliance of data-type mapping. Any mismatches detected at the second level of compliance analysis can be reported to a user interface and/or stored in code-analysis results 676.

A third level of analysis (which may be referred to as an "internal representation level") can also be performed by the code analyzer 650. This level of analysis relates to how the code parts, attributes, and software interfaces are represented in the computing language of the implementation code 104. For the third level of analysis, the code analyzer 650 can determine, for example, whether an attribute of a code part is represented with the correct data type (e.g., int, float, char, unsigned, struct, pointer, array, etc.) that was specified at the design level, and can further determine whether the attribute is represented with the correct size or precision (e.g., short, long, double, array size) that is compatible with the size specified at the design level.

Compliance checking at the third level can comprise checking for consistency of data type between an intended implementation data type defined in the specified model 102 or meta-model description 101 and a corresponding native data type used in the implementation code 104. Returning to the example of FIG. 7, a programmer may implement the parameter "arg1" (which may have been specified in the specified model as an integer ranging between −20 and 40 degrees) using a short integer data type in C code, for example. The code analyzer 650 may determine that the implemented data type in the implementation code 104 is compatible with the intended data type given in the specified model 102. Because of implicit conversion in some implementation code languages, compliance analysis at the second and/or third level can check arithmetic or logic operations, for example, for any re-casting or implicit conversion of data types that would render the data non-compliant with the data type defined in the provable data construct 720. Compliance analysis at the third level can also include checking values of mapped data types using static analysis of the implementation code 104 to determine whether the values obtained by static analysis comply with mapped values or ranges defined in at least the specified model 102.

In embodiments, the code analyzer 650 can evaluate the implementation code 104, whether or not static analysis is performed, to ascertain whether consistency is maintained between the physical level, the design level, and/or the internal representation level. In addition, the code analyzer 650 can evaluate the implementation code 104, whether or not static analysis is performed, to determine whether the internal representation complies with provable data constructs 720 derived from at least the specified model 102. Any inconsistencies or mismatches can be reported to a graphical user interface 180 and/or recorded to memory 670 as warnings, errors, or mismatches by the code-proving system 100.

Additional aspects of the implementation code 104 can also be checked for compliance by the code analyzer 650. For example, another aspect that can be evaluated is error handling by the implementation code 104. In some cases, a specified model 102 can specify a number of error codes permitted for a code part 503-1. The specified model 102 can further specify specific error messages that are to be implemented. Additionally or alternatively, the meta-model description 101 can specify numbers of error codes and error messages for well-defined code parts, such as the RTE functions of AUTOSAR. In embodiments, the code analyzer 650 is adapted to identify numbers of error codes and error messages that result from static analysis of the implementation code 104 and compare against corresponding data fields in one or more provable data constructs 720 (e.g., error code data type "ev1 data type" and error code range or data values "ev1 range", referring to FIG. 7) for compliance evaluation. In some cases, an implementation may require more error codes than allotted by the specified model 102 or meta-model description 101. A report of non-compliance of error handling can beneficially inform the system designer to allot more error codes in one or more model parts 502-1, 502-2. In this way, a specified model 102 can be updated in response to a need or action by the implementation code 104.

Another aspect of the implementation code 104 that can be checked is execution order of code parts 503-1, 503-2. In an AUTOSAR system for example, safety considerations may require that certain system operations or tasks can only be performed after other system operations have completed. Such requirements can dictate an order or sequence of executable functions, for example, and the order can be specified in the corresponding specified model 102 or the meta-model description 101. In embodiments, the code analyzer 650 can detect the sequence of function executions in a code extract 504 and compare the detected sequence to a permitted sequence derived from the specified model 102 and/or meta-model description 101 as a provable data construct.

In the example of FIG. 7, information pertaining to the sequence of execution of code parts can be indicated in a provable data construct 720 by a "precedence" type data field, which can be either "preemptive" or "non-preemptive" in the case of an AUTOSAR application. A non-preemptive function cannot be interrupted or blocked once its execution begins. A preemptive function can be suspended if a predefined condition occurs during execution of the system-control code, causing the preemptive function to wait for an event that will allow the function to complete. Information pertaining to the sequence of code parts can also be recorded in a scheduling table that can be included with the specified model 102. The code analyzer 650, during static analysis of the implementation code 104, can determine the flow of execution of code parts 503-1, 503-2 in one or more code segments to assess whether the flow of execution complies with function precedence and/or scheduling defined in the specified model 102.

In embodiments, the code analyzer 650 can also analyze a specified model 102 for compliance with a meta-model description 101 for which the specified model 102 is intended to comply. For example, the code analyzer 650 can review a specified model 102 for syntax errors, among other things. The code analyzer 650 can also review a specified model for semantic errors, such as reference to an undefined data or function type or an executable function with no triggering event defined that invokes the function. In some cases, the code analyzer 650 can review a specified model 102 for compliance with a template specified by the meta-model description 101 and/or for correct usage of model parts (e.g., RTE functions in AUTOSAR) defined by the meta-model description 101. Compliance analysis of a specified model 102 can comprise, in part, comparing parts of a specified model against data constructs derived from the meta-model description 101 and stored in meta-model metrics 674.

Although limited checking of implementation code 104 without a corresponding specified model 102 (e.g., checking legacy code) can be performed using information available from the meta-model description 101, such proving may be incomplete. For such embodiments, the code-proving system 100 can identify the extent to which the implementation code 104 is checked. Legacy implementation code 104 can be checked more completely using a corresponding legacy specified model 102. In such a case, code proving can be performed with or without information from a current meta-model description 101.

Figure 8A:
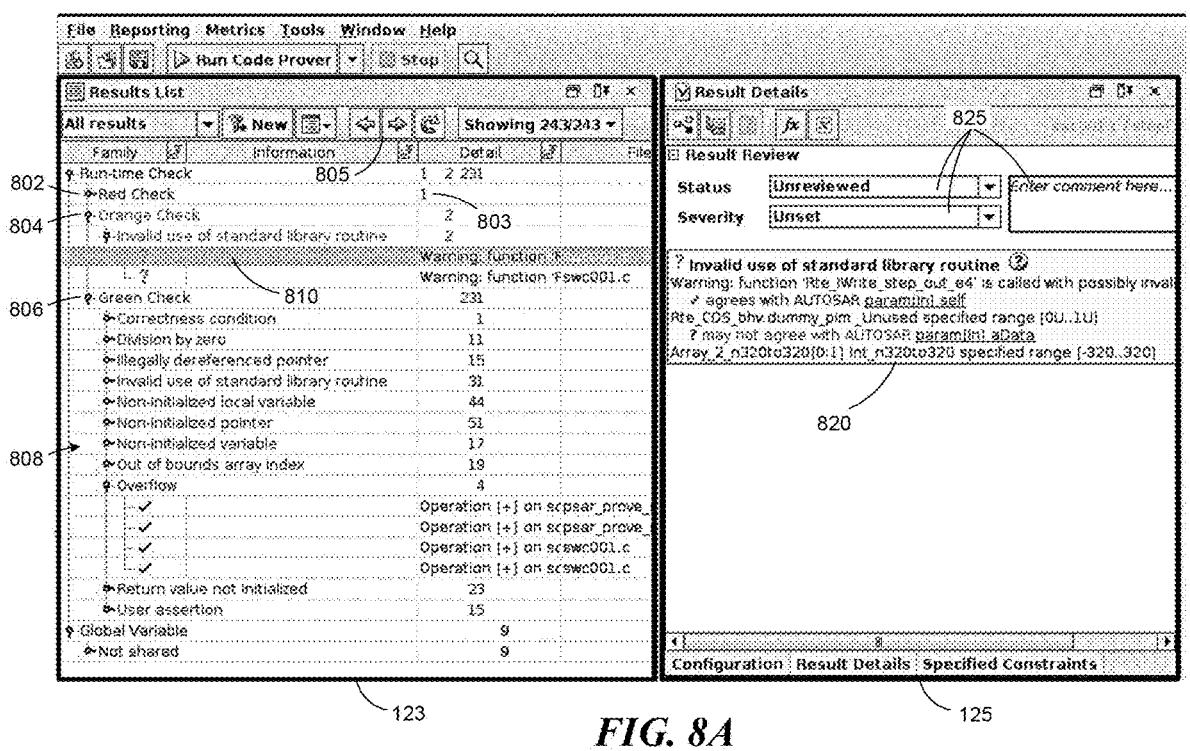
Figure 8C:
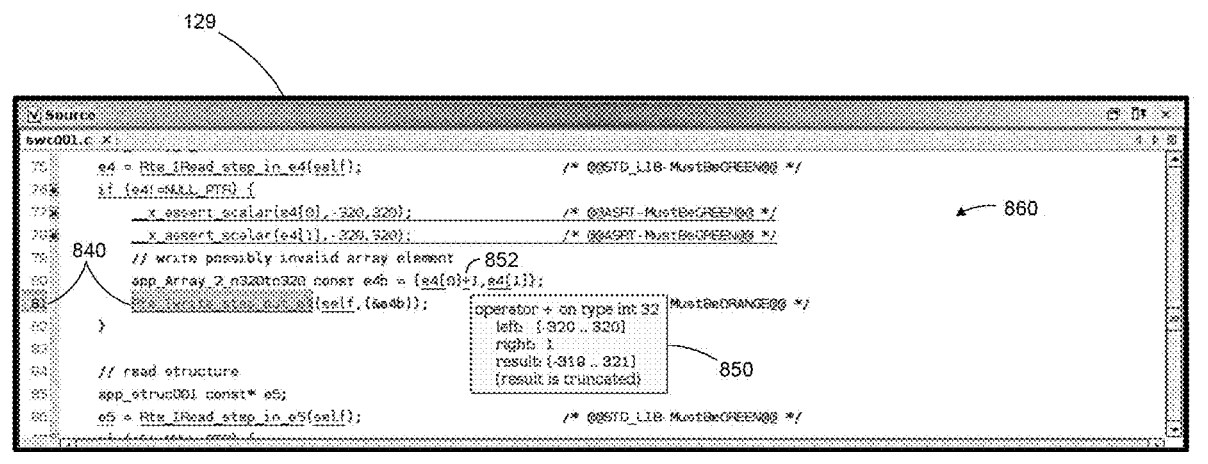

FIG. 8A-8C depict panels or windows that can be part of a graphical user interface 180 that displays code-analysis results provided by the code analyzer 650 to the user-interface engine 660 for display. As described above, the user-interface 180 can comprise one or more panels 123, 125, 127, 129 that each provide information about different aspects of code-analysis results. Some or all of the panels can be implemented, for example, as pop-up windows or tiled pages in some embodiments that are selectable by icons or tabs. A summary panel 123, shown in FIG. 8A, can include a cursory, high-level summary of the code-analysis results in one or more expandable lists, for example. The listed results can be grouped according to severity of the result. Order, text, symbols, and/or color coding can be used to indicate the severity of code-analysis results. For example, a listed entry for a first level of severity 802 can be indicated by a first color (e.g., red) and identify a number 803 of potentially fatal coding errors (e.g., division by zero, infinite loop, etc.) and/or non-compliances (e.g., variable out of range, incorrect function invocation sequence, etc.). Attempted execution of the corresponding code parts may result in failure of the implementation code 104 and/or system-control code to execute properly. A listed entry for second level of severity 804 can be indicated by a second color (e.g., orange) and identify a number (2 in this example) of potential flaws (e.g., incorrect units, data type mismatch, truncation, invalid function use, etc.) in the implementation code 104 that will allow the implementation code 104 to execute but may produce an unexpected result. A listed entry for a third level of severity 806 can be indicated by a third color (e.g., green) and identify a number of instances in which the implementation code 104 passed compliance analysis checks performed by the code analyzer 650.

In some cases, the summary panel 123 can display information pertinent to a single code segment 205, and a user can scroll through results for other code segments using navigational tools in a menu bar of the summary panel 123 (e.g., left and right arrows 805). The high-level summary can include expandable items and active links for various informational entries on the panel to obtain further information about the selected entry. For example, one or more severity level entries 802, 804, 806 (e.g., "Red Check", "Orange Check", "Green Check") can be responsive to a user click or double-click on the entry, causing an expanded list 808 with further information about different compliance and/or coding standard checks to be rendered in the panel 123 or in a pop-up window by the user-interface engine 660.

Additionally, one or more entries can be responsive to user selection (e.g., a right-hand mouse button click, click sequence, or keystroke sequence). A selected entry 810 can cause the user-interface engine 660 to display further information pertinent to the selected entry in other panels (e.g., details panel 125, model panel 127, and source code panel 129 of the display). For example, a user can select an entry 810 in the summary panel 123 identifying a potential or a fatal non-compliance in the implementation code 104 detected by the code analyzer 650. In response, the user-interface engine 660 can render further details 820 about the non-compliance in the details panel 125.

The details panel 125 can identify one or more model part(s) 502-1, 502-2 and/or corresponding code parts 503-1, 503-2 associated with the non-compliance by the implementation code 104 (e.g., provide identifiers for runnables or functions, such as "Rte_IWrite_step_out_e4" in the illustrated example). The details panel 125 can further include information about values allowed for attributes of the code parts that were obtained by the model translator 640 from the specified model 102 or obtained from the meta-model description 101. The details panel 125 can include review status elements 825 that allow a user to set a severity level for the reviewed non-compliant or potentially non-compliant item and mark whether the item has been reviewed. The details panel 125 can also allow a user to enter comments about the item. Data selected or entered regarding review status can be stored for later viewing by a programmer and/or model developer.

The user interface 180 can also include a model panel 127, an example of which is illustrated in FIG. 8B. In response to user selection of an entry 810, the user-interface engine can render relevant information from the specified model 102 (e.g., retrieved from the specified model metrics 672) and/or information from the meta-model description 101 (e.g., retrieved from meta-model metrics 674) in the model panel 127. In embodiments, the code analyzer 650 maintains a link between an analyzed code part 503-1, the implementation code 104, corresponding model part 502-1 and model segment 501 information provided in the specified model 102, and any relevant information provided from the meta-model description 101. As an example, information that can be displayed in the model panel 127 includes information obtained from the specified model 102 and implementation code 104 about one or more parameters of a function, such as data type 842, physical range and units 844, data mapping 846, and what components 847, 849 in the specified model and/or implementation code include a computation method and/or constraint for the parameter.

The user interface 180 can also include a source code panel 129, illustrated in FIG. 8C, that displays a portion 860 of the implementation code 104 containing the code part identified by the user-selected entry 810. In some cases, a user can hover a cursor over or select a relevant non-compliant code part 840 in the source code panel 129, and in response, the user-interface engine 660 can render a graphical affordance, for example, a pop-up window 850 providing further information about the cause of the non-compliant code part. The information about the cause of non-compliance can be provided by the code analyzer 650 as a result of static analysis of the code part and comparison with constraints derived from the specified model or meta-model, for example. In the illustrated example, a mathematical operation 852 on an integer results in changing an integer value to a value that is out of bounds out of a range of values permitted by the specified model 102. As a result, the resulting integer may be truncated. Accordingly, a possible truncation error upon execution of the code part is indicated to the user.

In implementations, source implementation code 104 in the source code panel 129 can be visually altered to indicate code parts of the implementation code that have been checked by the code analyzer and comply or do not comply with at least the specified model 102. Severity of non-compliance can also be indicated. For example, a same severity and color-rendering scheme may be used in the source code panel 129 as used in the summary panel 123. As such, lines of code exhibiting a fatal coding error may be rendered in red, and lines of code that pass code-proving checks may be rendered in green, though other color coding or differential rendering schemes can be used. Lines of code that have not been checked may be rendered in black, according to some embodiments.

In certain embodiments, a user may desire to test the implementation code 104 with different constraints than permitted by the specified model 102 and/or the meta-model description 101. For example, a user may wish to test a code part 503-1 using a data value range that is more or less stringent than a range specified in the specified model 102. To accommodate this, the user-interface engine 660 can display user-changeable, provable data constructs as active elements 830 in the model panel 127, for example and referring again to FIG. 8B. A user can select (e.g., double-click on) the active element 830 to activate a pop-up window, for example, that allows the user to alter one or more values for the provable data construct and re-execute compliance analysis of the relevant portion of implementation code. For example, a pop-up window can allow the user to enter a different data range (−200 . . . 200) than is currently used for proving the relevant code.

The illustrations in FIG. 8A-FIG. 8C are intended as examples only for purposes of explanation, and should not be interpreted as the only way to convey information regarding compliance or non-compliance between the analyzed implementation code 104 and at least a specified model 102. Code-analysis results can be displayed in other ways with additional or fewer panels.

Figure 9:
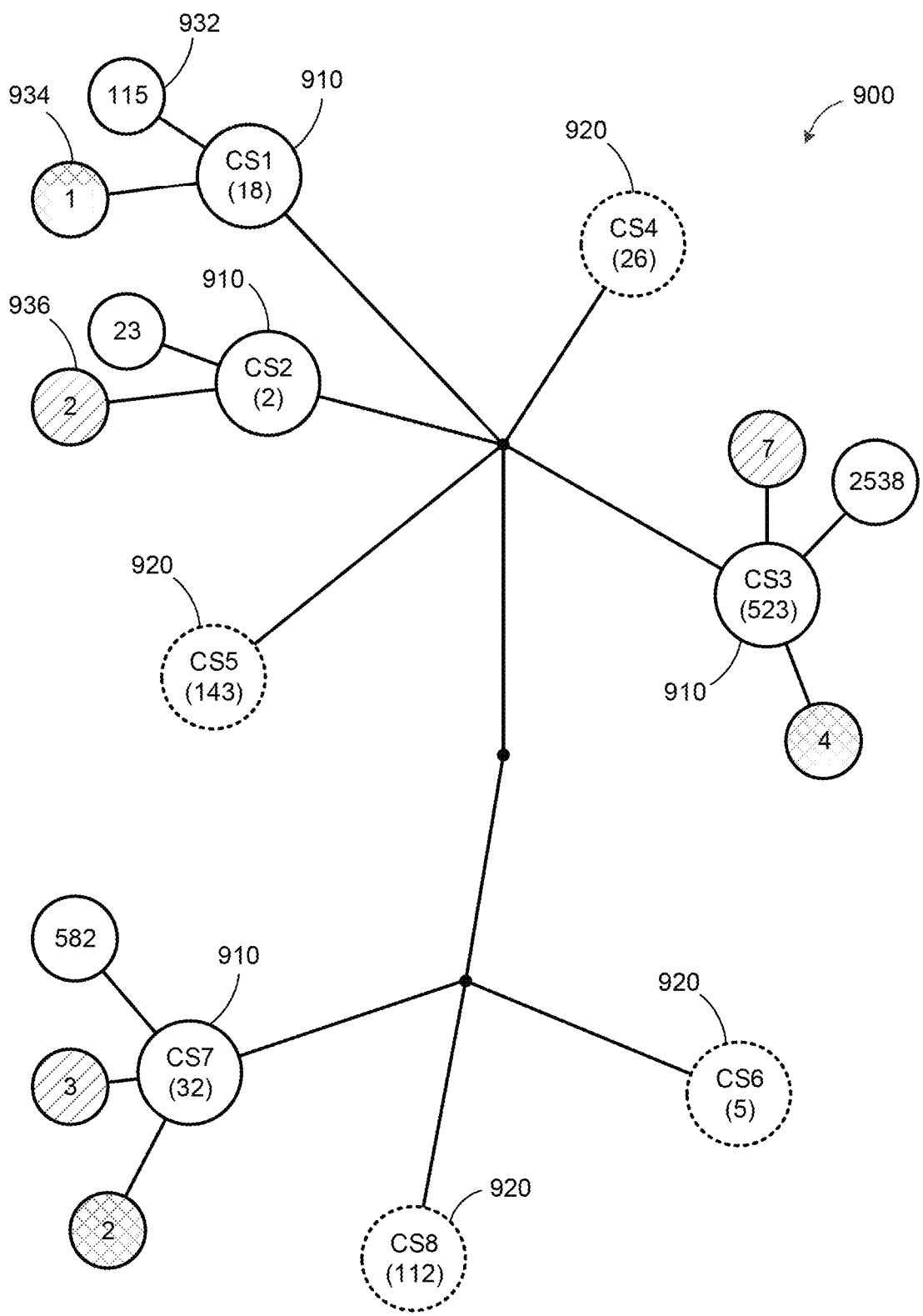
FIG. 9 depicts a second embodiment of a graphical user interface that may be used to display results of code analyses and receive user input.

FIG. 9 depicts another way in which code-analysis results can be rendered by the user-interface engine 660 on a display 191. In some embodiments, a code-segment symbol 910, 920 can be rendered for each code segment 205 that is to be analyzed for compliance by the code analyzer 650. An identifier (e.g., a function name or designation, "CS1") for a code segment can be displayed with the code-segment symbol 910 and a number of executable functions can be displayed in parentheses with the code-segment symbol 910. The illustration in FIG. 9 includes eight code-segment symbols each having a number of executable functions ranging from 2 to 523. In some cases, a number of lines of code or files detected in the implementation code 104 that are associated with each code segment can be displayed with the code segment symbols 910. As the code analyzer 650 completes analysis of a code segment, the user-interface engine 660 can render the symbol with a first attribute (e.g., a solid perimeter) that is different from an initial rendering of the code segment. Code segments that have not yet been checked by the code analyzer 650 can be rendered with a different attribute (e.g., a dashed perimeter).

For each code segment that has been checked by the code analyzer 650, the user-interface engine 660 can further render adjacent symbols 932, 934, 936 with different visual attributes (e.g., color, shape, hatching) that summarize code-analysis results. For example a first adjacent symbol 932 rendered with a first visual attribute may correspond to a number of instances in which the implementation code 104 has passed a code check. A second adjacent symbol 934 rendered with a second visual attribute may indicate a number of instances in which a fatal non-compliance or coding error was detected in the implementation code. A third adjacent symbol 936 rendered with a third visual attribute may indicate a number of potential non-compliances detected in the implementation code 104 that may not be fatal but may lead to an unexpected result. In embodiments, each of the displayed symbols corresponding to code segments that have been checked by the code analyzer 650 can be active, such that a user can click on or select each symbol to obtain further information about code-analysis results. For example, a user can click on an adjacent symbol 934 to obtain a list of fatal errors detected in the implementation code, information about or links to details about the errors, information from or links to information from the specified model and/or meta-model relevant to the detected errors, and source code or links to source code relevant to the detected errors, all of which are rendered by the user-interface engine 660 responsive to user selection and navigation of displayed active symbols and links. The display shown in FIG. 9 can provide an easily-understandable and navigable graphic for a user that indicates which segments of implementation code 104 have been checked and which segments contain, potentially contain, or do not contain, code errors.

In some cases, not all code may be available to check implementation code 104 corresponding to a specified model 102. For example, for proprietary reasons an implementer may provide only some code segments (e.g., CS1, CS2, CS3, CS7 in reference to FIG. 9) for compliance analysis. Since the code extract prover 106 extracts and analyzes the implementation code 104 on a part-by-part and segment-by-segment basis as described above, it can analyze only some of the code segments of an implementation code 104. The code-proving system 100 can report, as indicated in FIG. 9, which code segments have been analyzed and which code segments were detected but have not been analyzed.

Similarly in some cases, not all implementation code may be available to check a code segment 205. Referring again to FIG. 5, although there may be enough code to perform a complete dependency analysis for one code part 503-1 (runnable1) of a code extract 504, there may not be enough code to perform a complete dependency analysis for another code part 503-2 (runnable2) of the code extract 504. In some cases, a code part may be withheld for proprietary or security reasons. Since the code analyzer 650 can analyze individual code parts within the code extract 504, it can analyze only some of the code parts 503-1 of a code extract 504 and report the extent to which the code extract or corresponding code segment and/or model segment 501 has been analyzed for compliance.

Figure 10:
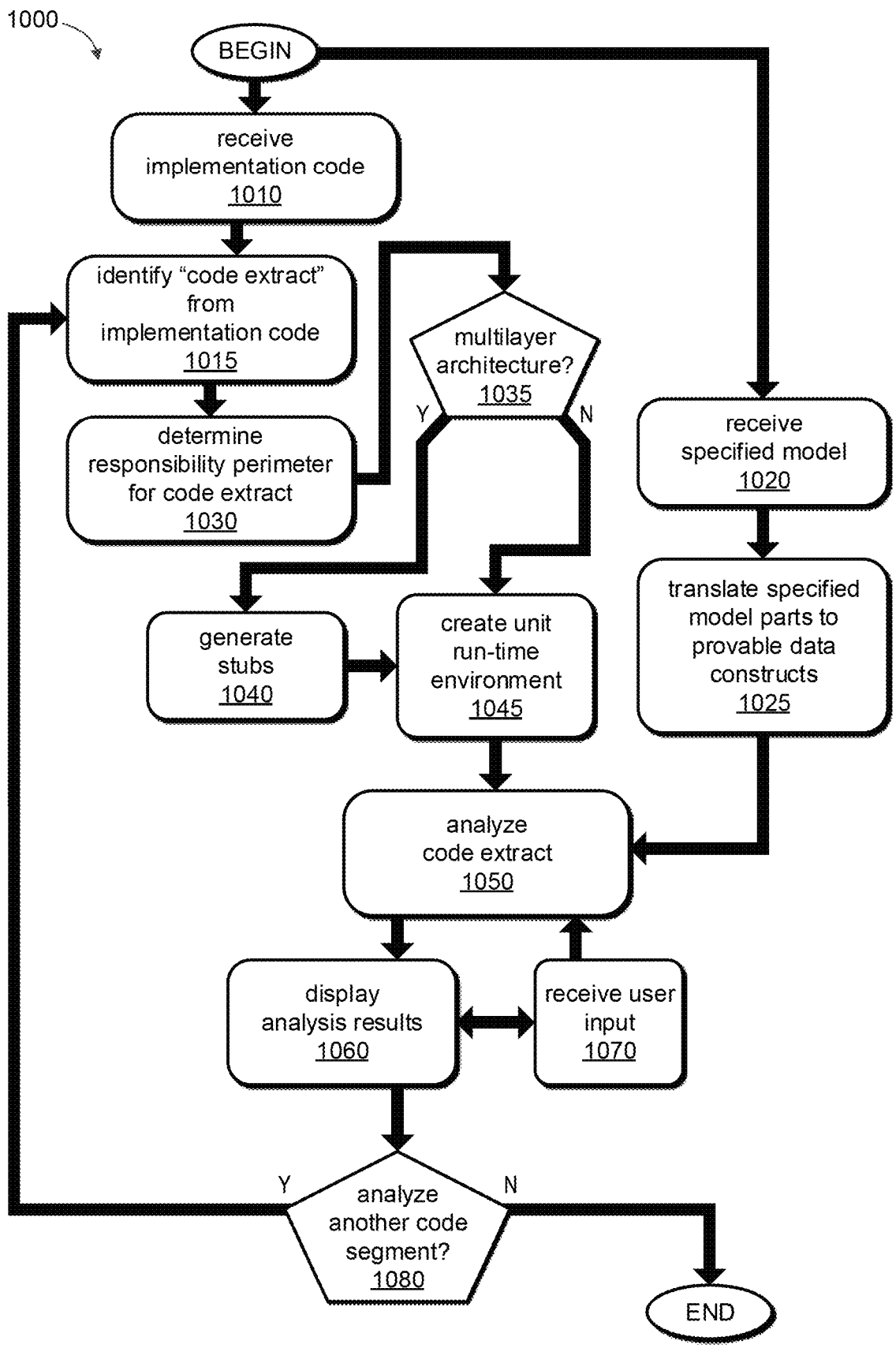
FIG. 10 illustrates example acts associated with a method for evaluating compliance of implementation code with at least a specified model.

Methods of analyzing implementation code 104 for compliance with at least a specified model 102 can be implemented with a code-proving system 100 performing a series of acts. Acts associated with an example method 1000 for analyzing implementation code 104 are depicted in FIG. 10, though fewer or additional acts can be used in alternative embodiments. In embodiments, a method 1000 for analyzing implementation code can begin with a step of receiving (1010) implementation code 104 and receiving (1020) a specified model 102 by a code-proving system 100. A meta-model description 101 can be received with the specified model 102 in some cases or may be previously obtained (e.g., previously programmed into or stored in memory of a code-proving system 100). A code extractor 610 can identify for extraction (1015), and in some cases extract, code extracts 504 from the implementation code using, at least in part, information from the received specified model 102, and in some cases information from the meta-model description 101. The code extractor can determine (1030) a responsibility perimeter of the implementation code 104 for a code extract, e.g., determine which portions of the implementation code 104 are relevant to a model segment identified in the specified model 102. The relevant portions of the implementation code identified for extraction can be determined in part by the lines of implementation code 104 that are affected by one or more code parts that are identified in the specified model 102 as corresponding model parts of the model segment for which a code extract is sought. In some cases, boundary points of the relevant portions of implementation code can be identified as predefined functions that are specified in the meta-model description 101, as described above in connection with FIG. 5. For a multi-layer software architecture, the boundary for the code extract can be determined in part by one or more executable functions (e.g., runtime environment function) and/or software interfaces associated with an adjacent software layer, wherein information about the one or more executable functions and software interfaces is known from the meta-model description 101.

A method 1000 can also comprise translating parts of the specified model, and in some cases the meta-model, to provable data constructs 720, as described above in connection with FIG. 7. In some embodiments, the translating can include mapping of data types from a data type defined in the specified model 102 to a data type that is suitable for implementation on a hardware component that will be used to execute the implementation code. Attributes of the mapping can be recorded as data fields in a provable data construct 720, according to some embodiments.

A method can further comprise determining (1035) whether the implementation code 104 pertains to a multi-layer architecture (for which abstraction of underlying software layers can be employed) or a single-layer architecture, which can be specified in the meta-model description 101. If it is determined that the implementation code pertains to a multi-layer architecture for which abstraction is needed, stubs can be generated (1040) as abstractions of adjacent layer(s) of software before creating a unit run-time environment. The stubs can be generated using information specified in the meta-model description 101. If the implementation code corresponds to a single layer of software (which may include only well-defined function calls to libraries or other well-defined functions associated with a computer language), it may not be necessary to create stubs in some cases and a step of creating (1045) a unit run-time environment for proving a code extract is performed.

A method 1000 of analyzing implementation code 104 can further comprise analyzing (1050) a code extract 504. The analysis can include static analysis of the code extract's runtime behavior as described above. In some cases, the analysis of the code extract can include checking for coding standard violations. In embodiments, the analysis can comprise comparing values of attributes determined from static analysis of code parts in the code extract with provable data constructs that have been derived from a received specified model 102 and/or the meta model 101. A method 1000 can also include displaying (1060) analysis results. For example, the results can rendered on a graphical user-interface 180 as depicted in FIG. 8A-FIG. 8C. A user can select active elements displayed in the interface to obtain further information about code-analysis results or to re-execute code analysis for certain code parts (e.g., using a newly defined constraint entered via the user interface). Accordingly a method 1000 can include receiving (1070) user input that causes a user-interface engine 660 to alter the displayed results and/or causes the code analyzer 650 to re-execute an analysis of a code extract or to perform analysis of a next code segment. A method 1000 can further include an act of determining (1080) whether or not there exists another code segment to be analyzed. If it is determined from the specified model 102 that there is another code segment to be analyzed, the process flow can return to the act of extracting (1015) a code extract from the implementation code 104 that corresponds to a next model segment of the specified model. If there is not another code segment to be analyzed, the process can end.

Figure 11:
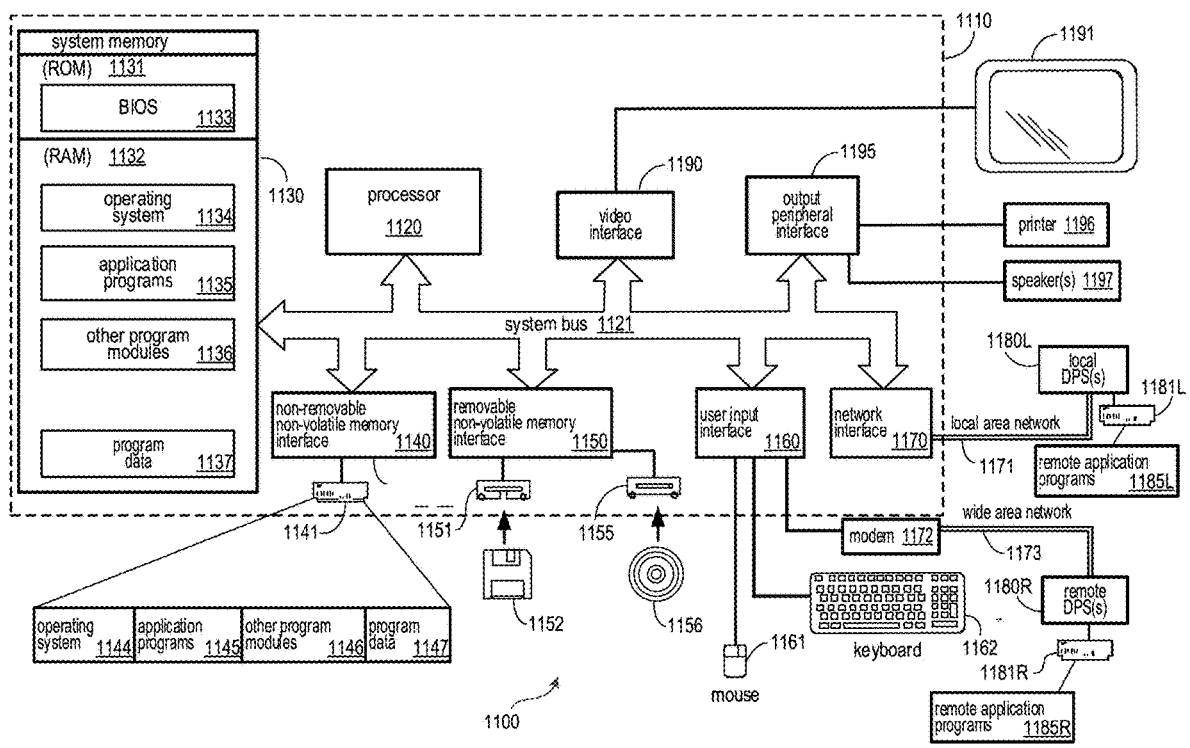
FIG. 11 depicts an example of a computing environment that may be specially adapted with computer programming instructions to evaluate compliance of implementation code with at least a specified model.

FIG. 11 depicts, in further detail, components of a data-processing system 110 that can be adapted for operation as a code-proving system 100. Some or all of the components shown may be present in a code-proving system 100, for example. In a distributed computing environment, some components can be located on a server and some components can be located on a client device. In some embodiments, a device for implementing compliance analysis of implementation code 104 can include a computing device 1110 which can be embodied as a personal computer, a workstation, or a laptop computer. Suitable workstations include Dell Precision series of workstations from Dell, Inc. of Round Rock, Tex., the HP Z400, Z600 and Z800 series of workstations from Hewlett Packard Co. of Palo Alto, Calif., among others. Other computing devices that may be used include palm computers, tablets, and other portable computing devices, e.g., smart phones, though computing devices with processing and memory capabilities that are too small to handle a large specified model 102 and corresponding implementation code 104 can interface with a server over a network where at least a portion of the code-proving analysis can be carried out. In this regard, the present embodiments can be implemented in a networked computing architecture (e.g., client-server architecture, public and/or private cloud computing arrangement).

Components of computing device 1110 can include, but are not limited to, a processing unit 1120, a memory 1130, and a bus 1121 that couples various components including the memory to the processing unit 1120. Example processing units 1120 include, but are not limited to, single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others. Example processing units 1120 can also include any one of or a combination of a single central processing unit (CPU), a multi-core CPU, a graphics processing unit (GPU), a field programmable gate array (FPGA), an application specific integrated circuits (ASIC), etc. where there can be more than one processing unit of a same type in a combination.

The bus 1121 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 can include one or more types of machine-readable media. Machine-readable media can be any available media that can be accessed by computer 1110 and includes both volatile and nonvolatile, manufactured storage media, removable and non-removable manufactured storage media. By way of example, and not limitation, machine-readable media can comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by computer 1110.

The memory 1130 can include computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, can be stored in ROM 1131. RAM 1132 can contain data and/or program modules that are immediately accessible to and/or presently being operated on by processing unit 1120. By way of example, and not limitation, FIG. 11 illustrates an operating system 1134, application programs 1135, other program modules 1136, and program data 1137.

The computer 1110 can also include other removable/non-removable, volatile/nonvolatile machine-readable media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 1141 can be connected to the system bus 1121 through a non-removable memory interface such as interface 1140, and magnetic disk drive 1151 and optical disk drive 1155 can be connected to the system bus 1121 by a removable memory interface, such as interface 1150.

The drives and their associated machine-readable media discussed above and illustrated in FIG. 11, provide storage of machine-readable instructions, data structures, program modules and other data for the computer 1110. In FIG. 11, for example, hard disk drive 1141 is illustrated as storing operating system 1144, application programs 1145, other program modules 1146, and program data 1147. These components may either be the same as, or different from, operating system 1134, application programs 1135, other program modules 1136, and program data 1137. Operating system 1144, application programs 1145, other program modules 1146, and program data 1147 are given different numbers here to illustrate that, at a minimum, they are different copies.

A user can enter commands and information into the computer 1110 through input devices such as a keyboard 1162 and pointing device 1161, commonly referred to as a mouse, trackball or touch pad. Other input devices (not shown) can include a microphone, joystick, game pad, satellite dish, scanner, or the like. These and other input devices can be connected to the processing unit 1120 through a user input interface 1160 that is coupled to the system bus, but can be connected by other interface and bus structures, such as a parallel port, game port or a universal serial bus (USB). A monitor 1191 or other type of display device can also be connected to the system bus 1121 via an interface, such as a video interface 1190. In addition to the monitor, a computing device 1110 can also include other peripheral output devices such as speakers 1197 and printer 1196, which can be connected through a output peripheral interface 1195.

The computer 1110 may operate in a networked environment using logical connections to one or more remote devices, such as a remote computer 1180. The remote computer 1180 can be a personal computer, a server, a router, a network PC, a peer device or other common network node, and can include many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments may be commonplace in offices, enterprise-wide computer networks, intranets and the Internet. Network connections can be wired, optical fiber based, or wireless.

When used in a LAN networking environment, the computer 1110 can be connected to the LAN 1171 through a network interface or adapter 1170. When used in a WAN networking environment, the computer 1110 can include a modem 1172 or other means for establishing communications over the WAN 1173, such as the Internet. The modem 1172, which can be internal or external, can be connected to the system bus 1121 via the user input interface 1160, or other appropriate mechanism. In a networked environment, program modules depicted relative to the computer 1110, or portions thereof, can be stored in a remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Figure 12:
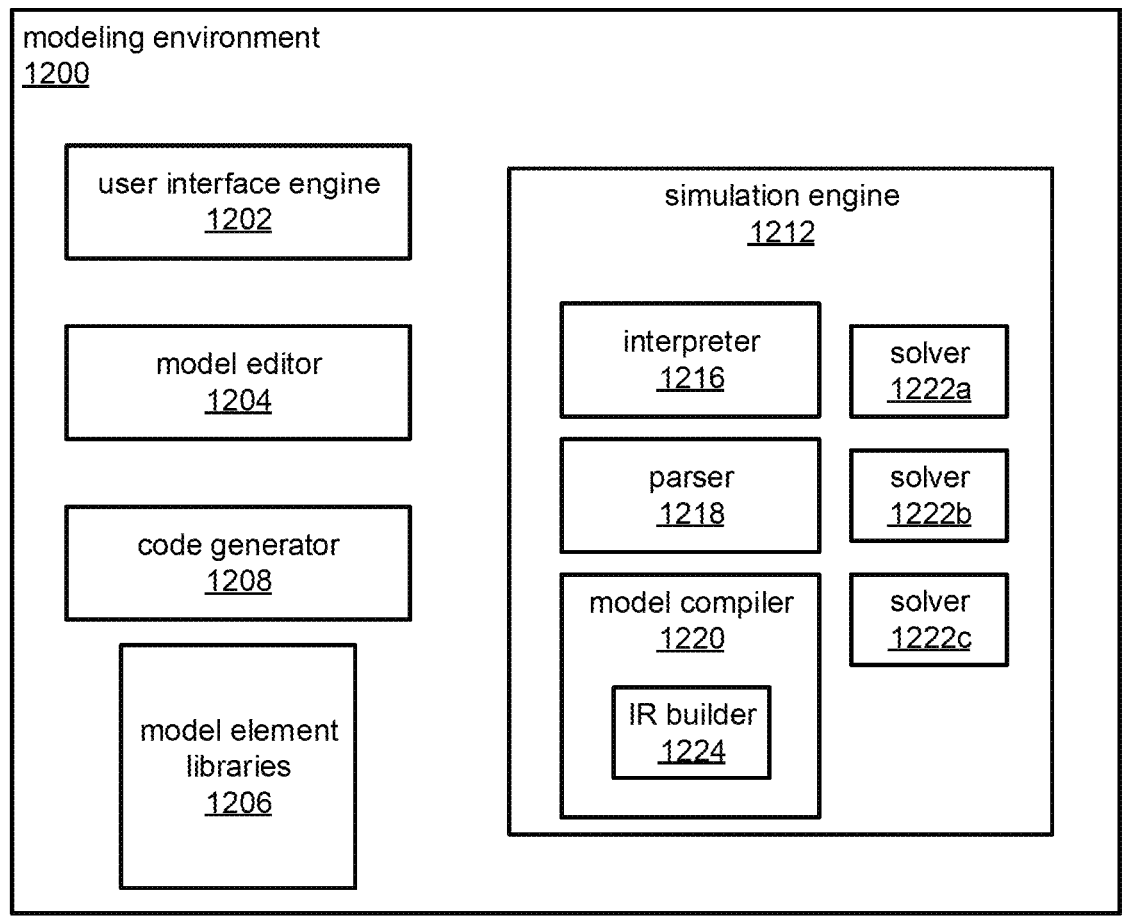
FIG. 12 is a partial, schematic illustration of an example of a modeling environment.

Some models related to the present embodiments can be developed and simulated in a modeling environment 1200, and example of which is depicted in FIG. 12. The modeling environment 1200 can include a User Interface (UI) engine 1202, a model editor 1204, one or more model element libraries 1206, a code generator 1208, and a simulation engine 1212. The UI engine 1202 can create and present one or more User Interfaces (UIs), such as Graphical User Interfaces (GUIs) and/or Command Line Interfaces (CLIs), on a display 191 of a data processing device, such as a workstation, laptop, tablet, etc. The GUIs and CLIs can provide a user interface to the modeling environment 1200, such as a model editing window. The model editor 1204 can perform selected operations on a model, such as open, create, edit, and save, in response to the user inputs or programmatically.

The simulation engine 1212 can include an interpreter 1216, a parser 1218, a model compiler 1220, and one or more solvers, such as solvers 1222*a-c*. The model compiler 1220 can include one or more Intermediate Representation (IR) builders, such as IR builder 1224. In some implementations, one or more IR builders can be included or associated with the solvers 1222. The simulation engine 1212 can execute, e.g., compile and run or interpret, computer-generated, executable models using one or more of the solvers 1222*a-c*. For example, the solvers 1222 can generate a set of equations for a model, and can solve the set of equations. The solvers 1222 can also generate a solution for an in-memory, intermediate representation (IR) of a model that represents a set of equations. The solvers 1222 can generate the solution for the IR using numerical techniques. Exemplary solvers include one or more fixed-step continuous time solvers, which can utilize numerical integration techniques, and one or more variable-step solvers, which may, for example, be based on the Runge-Kutta or Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2017 ed.)

The code generator 1208 can access a model, such as a specified model 102, and can generate code for the model. In some embodiments, the generated code can be source code, which can be compiled by the model compiler 1220, and executed by one or more processors outside of the modeling environment 1200. The generated code can thus be standalone code relative to the modeling environment 1200. Examples of generated code include Ada, Basic, C, C++, C#, FORTRAN, assembly code, and Hardware Description Language (HDL) code, such as VHDL, Verilog, or SystemC, among others, which may be used to synthesize a programmable logic device.

Exemplary modeling environments include the MATLAB® technical computing environment (TCE) and the Simulink® model-based design environment both from The MathWorks, Inc. of Natick, Mass., as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level modeling environment can contain less implementation detail, and thus operate at a higher level than certain programming languages, such as the C, C++, C#, and SystemC programming languages.

With a modeling environment 1200, simulated execution of a model can be carried out, e.g., to approximate the operation of a dynamic system. Simulated execution of a model may also be referred to as simulating the model. Models constructed within the modeling environment 1200 may include textual models, graphical models, such as block diagrams, state-based models, discrete-event models, physical models, and combinations thereof. A graphical model can include icons or blocks that represent computations, functions or operations, and interconnecting lines or arrows among the blocks can represent data, signals, or relationships among those computations, functions, or operations. The icons or blocks, moreover, can be selected by the user from one or more of the libraries or palettes 1206 that contain icons or blocks for the blocks supported by the modeling environment 1200. A model editor GUI can include a Run button that can be selected by the user. The modeling environment 1200 can also be configured to receive a run command entered by the user, e.g., in the GUI or in a Command Line Interface (CLI). In response to the user selecting the Run button or entering the run command, the simulation engine 1212 can execute the model, and can present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 1200 may implement a declarative language. A declarative language is a language that expresses the logic of a computation without describing its control flow. A declarative language can describe what a program must accomplish in terms of the problem domain, rather than describe how to accomplish it as a sequence of the programming language primitives. In some cases, a declarative language can implement single assignment in which variables are assigned once and only once. Examples of declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model can include computational implementations that are implicitly defined by a declarative language.

It should be understood that the modeling environment 1200 is intended for illustrative purposes and that the present disclosure can be used with other modeling environments. For example in some implementations, the code generator 1208 and/or the compiler 1220 can be separate from the modeling environment 1200.

One or more of the user interface engine 1202, the model editor 1204, the code generator 1208, the model compiler 1220, and the simulation engine 1212 can be implemented through one or more software modules and/or libraries containing program instructions that perform the methods described herein when executed on logic circuitry of one or more processors. The software modules can be stored in a memory, such as a main memory, a persistent memory and/or a computer readable media, of a workstation, server, or other data processing machine or device, and executed by one or more processors. Other computer readable media can also be used to store and execute these program instructions, such as non-transitory computer readable media, including optical, magnetic, or magneto-optical media. In some embodiments, one or more of the user interface engine 1202, the model editor 1204, the code generator 1208, the model compiler 1220, and the simulation engine 1212 can comprise hardware registers and combinational logic configured and arranged to produce sequential logic circuits. In some embodiments, various combinations of software and hardware, including firmware, can be utilized to implement the described methods.

Suitable code generators for use with the present disclosure include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers can be used in addition to or alternative to those described for the modeling environment 1200.

Example methods of the described technology include combinations of processes (1) through (15) as described below.

(1) A computer-implemented process comprising acts of receiving a specified model; receiving implementation code corresponding to the specified model that comprises code that, when executed, performs at least one function for controlling one or more physical components of a dynamic system; identifying, from the specified model, a model part relevant to a functionality performable by the implementation code; translating the model part into at least one provable data construct; extracting, from the implementation code, a first code extract containing a code part that corresponds to the model part; automatically analyzing the first code extract to determine one or more attributes associated with the code part; determining compliance of the one or more attributes with the at least one provable data construct; and providing results of the automated analysis and compliance determination for display that identify whether the code part complies with at least the specified model.

(2) The process of (1), wherein the translating comprises identifying from the specified model a physical value or range of physical values specified for a first attribute of the model part; identifying from the specified model or at least the implementation code a mapping of the physical value or range of physical values in a first data type to one or more mapped values in a different second data type; representing the physical value or range of physical values in a first data field of the at least one provable data construct; and representing the one or more mapped values in a second data field of the at least one provable data construct.

(3) The process of (2), wherein the determining compliance comprises identifying one or more values for the first attribute from the automated analysis of the first code extract; and comparing the one or more values for the first attribute with the one or more mapped values; wherein the automatically analyzing may comprise performing static analysis of the first code extract to identify the one or more values for the first attribute.

(4) The process of (2), wherein the translating further comprises identifying from the specified model units associated with the first attribute and associating a representation of the units with the physical value or range of physical values in the first data construct.

(5) The process of any one of (1) through (4), wherein the specified model is written to comply with a meta model, the method further comprising determining a first boundary point within the implementation code that identifies a first portion of the implementation code to be extracted for the first code extract, wherein the first portion comprises at least part of the code part; and generating, in compliance with the meta-model, a first stub for the first portion of the implementation code, wherein the first stub emulates interaction of the first portion of the implementation code with at least one different software layer beyond the first boundary point.

(6) The process of (5), wherein determining the first boundary point comprises, in part, identifying a predefined function in the first portion of the implementation code that is invoked when the first portion of the implementation code is executing to access the at least one different software layer, wherein the predefined function has attributes that are defined by the meta-model.

(7) The process of (5) or (6), further comprising creating a unit run-time environment for static code analysis of the first code extract that comprises the first portion of the implementation code and the first stub, wherein the predefined function may be a runtime environment function specified for the Automotive Open System Architecture (AUTOSAR).

(8) The process of (5) or (6), further comprising determining at least a second boundary point within the implementation code that identifies at least a second portion of the implementation code to be extracted as part of the first code extract; extracting, from the implementation code, at least the second portion of the implementation code; generating at least a second stub for the at least a second portion of the implementation code; creating a unit run-time environment for the first code extract that includes the first portion of the implementation code, the first stub, the at least a second portion of the implementation code, and the at least a second stub; and automatically analyzing the first code extract to determine compliance of one or more attribute values determined from the automatic analysis of the first code extract with one or more corresponding data constructs translated from the specified model.

(9) The process of any one of (1) through (8), wherein the specified model is written to comply with a meta-model, wherein the meta-model is defined according to an industry collaborative and/or the meta-model is defined according to the Automotive Open System Architecture (AUTOSAR).

(10) The process of any one of (1) through (9), further comprising detecting non-compliance between a first attribute of the one or more attributes and a corresponding value or range of values represented in the at least one provable data construct; displaying on a user interface a portion of the implementation code that identifies a location of a code part at which the non-compliance was detected; and displaying on the user interface information from the specified model identifying a reason for the non-compliance of the first attribute.

(11) The process of any one of (1) through (10), further comprising detecting non-compliance between a first attribute of the one or more attributes and a corresponding range of values represented in the at least one provable data construct; displaying on the user interface the range of values as an active element; receiving input in response to selection of the active element that alters the range of values; and determining again compliance of the one or more attributes with the one or more data constructs.

(12) The process of any one of (1) through (11), wherein the implementation code comprise a first portion of code written in a first computer language and a second portion of code written in a second computer language, and/or code generated by Simulink.

(13) The process of any one of (1) through (12), further comprising automatically analyzing one or both of the implementation code and the specified model for syntax errors, wherein the method may further comprise identifying, from the specified model, an allowed execution sequence for at least two code parts of the code extract; and analyzing the first code extract to determine compliance of a detected execution sequence of the at least two code parts with the allowed execution sequence.

(14) The process of any one of (1) through (13), wherein the implementation code is a portion of a complete implementation code for the specified model, the method further comprising identifying a limit to which automated analysis of the first code extract and compliance determination can be performed; and providing information about the limit for display on a user interface.

(15) The process of any one of (1) through (14), further comprising identifying, from the specified model, one or more constraints on at least one error code associated with the model part; translating the one or more constraints to one or more error data field values for the at least one provable data construct; detecting one or more error codes in response to automatically analyzing the first code extract; and determining compliance of the detected one or more error codes with the one or more error code data field values.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:
1. A computer-implemented method comprising:
   receiving a specified model;
   receiving implementation code corresponding to the specified model that comprises code that, when executed, performs at least one function for controlling one or more physical components of a dynamic system;
   identifying, from the specified model, a model part relevant to a functionality performable by the implementation code;

translating the model part into at least one provable data construct;

extracting, from the implementation code, a first code extract containing a code part that corresponds to the model part;

automatically analyzing the first code extract to determine one or more attributes associated with the code part;

detecting non-compliance between a first attribute of the one or more attributes and a corresponding range of values represented in the at least one provable data construct;

providing results of the automatically analyzing and the detecting non-compliance for display;

receiving input that alters the range of values, one or more of the attributes, the one or more data constructs, or the model part corresponding to the one or more data constructs; and after altering, determining compliance of the one or more attributes with the one or more data constructs, where the one or more attributes and/or the data constructs have been altered.

2. The method of claim 1, wherein the translating comprises:

identifying from the specified model a physical value or range of physical values specified for a first attribute of the model part;

identifying from the specified model or at least the implementation code a mapping of the physical value or range of physical values in a first data type to one or more mapped values in a different second data type;

representing the physical value or range of physical values in a first data field of the at least one provable data construct; and representing the one or more mapped values in a second data field of the at least one provable data construct.

3. The method of claim 2, wherein the determining compliance comprises:

identifying one or more values for the first attribute from the automated analysis of the first code extract; and comparing the one or more values for the first attribute with the one or more mapped values; wherein the automatically analyzing may comprise performing static analysis of the first code extract to identify the one or more values for the first attribute.

4. The method of claim 2, wherein the translating further comprises identifying from the specified model units associated with the first attribute and associating a representation of the units with the physical value or range of physical values in the first data construct.

5. The method of claim 1, wherein the specified model is written to comply with a meta model, the method further comprising:

determining a first boundary point within the implementation code that identifies a first portion of the implementation code to be extracted for the first code extract, wherein the first portion comprises at least part of the code part; and generating, in compliance with the meta-model, a first stub for the first portion of the implementation code, wherein the first stub emulates interaction of the first portion of the implementation code with at least one different software layer beyond the first boundary point.

6. The method of claim 5, wherein determining the first boundary point comprises, in part:

identifying a predefined function in the first portion of the implementation code that is invoked when the first portion of the implementation code is executing to access the at least one different software layer, wherein the predefined function has attributes that are defined by the meta-model.

7. The method of claim 5, further comprising creating a unit run-time environment for static code analysis of the first code extract that comprises the first portion of the implementation code and the first stub, wherein the predefined function may be a runtime environment function specified for the Automotive Open System Architecture (AUTOSAR).

8. The method of claim 5, further comprising:

determining at least a second boundary point within the implementation code that identifies at least a second portion of the implementation code to be extracted as part of the first code extract;

extracting, from the implementation code, at least the second portion of the implementation code;

generating at least a second stub for the at least a second portion of the implementation code;

creating a unit run-time environment for the first code extract that includes the first portion of the implementation code, the first stub, the at least a second portion of the implementation code, and the at least a second stub; and automatically analyzing the first code extract to determine compliance of one or more attribute values determined from the automatic analysis of the first code extract with one or more corresponding data constructs translated from the specified model.

9. The method of claim 1, wherein the specified model is written to comply with a meta-model, wherein the meta-model is defined according to an industry collaborative and/or the meta-model is defined according to the Automotive Open System Architecture (AUTOSAR).

10. The method of claim 1, further comprising:

detecting non-compliance between a first attribute of the one or more attributes and a corresponding value or range of values represented in the at least one provable data construct;

displaying on a user interface a portion of the implementation code that identifies a location of a code part at which the non-compliance was detected; and displaying on the user interface information from the specified model identifying a reason for the non-compliance of the first attribute.

11. The method of claim 1, wherein the implementation code comprises:

a first portion of code written in a first computer language and a second portion of code written in a second computer language, and/or code generated by Simulink.

12. The method of claim 1, further comprising automatically analyzing one or both of the implementation code and the specified model for syntax errors, wherein the method further comprises:

identifying, from the specified model, an allowed execution sequence for at least two code parts of the code extract; and analyzing the first code extract to determine compliance of a detected execution sequence of the at least two code parts with the allowed execution sequence.

13. The method of claim 1, wherein the implementation code is a portion of a complete implementation code for the specified model, the method further comprising:

identifying a limit for which automated analysis of the first code extract and compliance determination can be performed; and providing information about the limit for display on a user interface.

14. The method of claim 1, further comprising:
identifying, from the specified model, one or more constraints on at least one error code associated with the model part;
translating the one or more constraints to one or more error data field values for the at least one provable data construct;
detecting one or more error codes in response to automatically analyzing the first code extract; and
determining compliance of the detected one or more error codes with the one or more error code data field values.

* * * * *